July 25, 1961

H. GOLDSMITH 2,993,412

MISSILE LAUNCHER

Original Filed Feb. 28, 1950

INVENTOR
*HERBERT GOLDSMITH*

BY
ATTORNEYS

July 25, 1961  H. GOLDSMITH  2,993,412
MISSILE LAUNCHER

Original Filed Feb. 28, 1950

INVENTOR
HERBERT GOLDSMITH
BY

ATTORNEYS

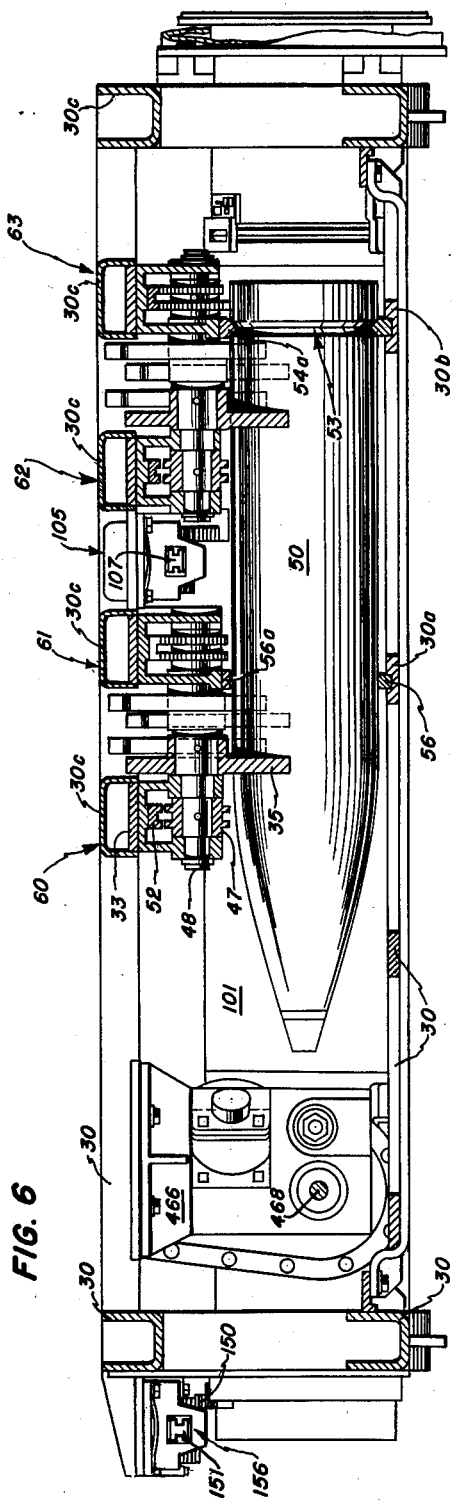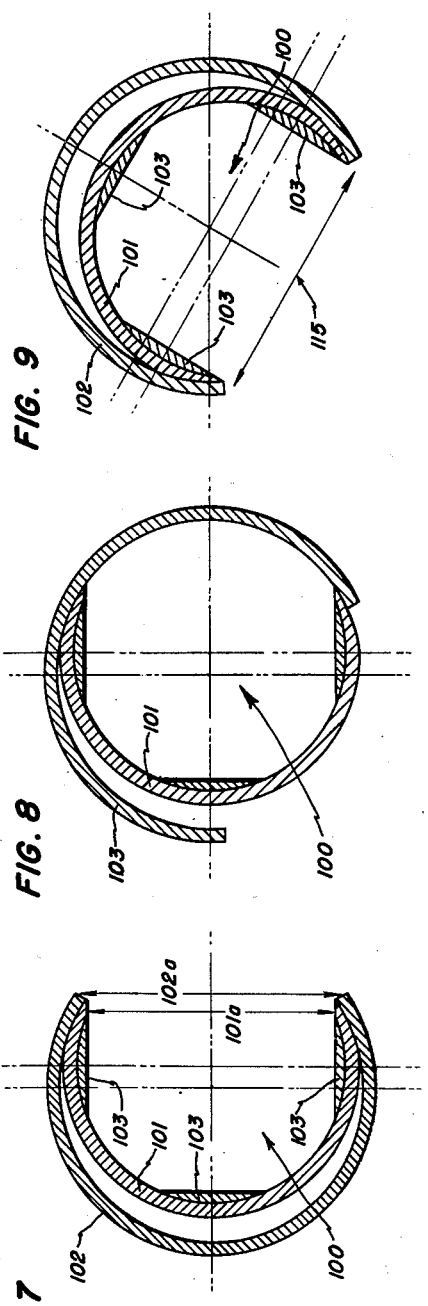

July 25, 1961

H. GOLDSMITH 2,993,412

MISSILE LAUNCHER

Original Filed Feb. 28, 1950

INVENTOR
HERBERT GOLDSMITH
BY
ATTORNEYS

July 25, 1961 H. GOLDSMITH 2,993,412
MISSILE LAUNCHER
Original Filed Feb. 28, 1950 12 Sheets-Sheet 7

INVENTOR
HERBERT GOLDSMITH
BY
ATTORNEYS

July 25, 1961 H. GOLDSMITH 2,993,412
MISSILE LAUNCHER

Original Filed Feb. 28, 1950 12 Sheets-Sheet 8

INVENTOR
HERBERT GOLDSMITH

BY
ATTORNEYS

INVENTOR
HERBERT GOLDSMITH
BY
ATTORNEYS

INVENTOR
HERBERT GOLDSMITH

July 25, 1961
H. GOLDSMITH
2,993,412
MISSILE LAUNCHER
Original Filed Feb. 28, 1950
12 Sheets-Sheet 12
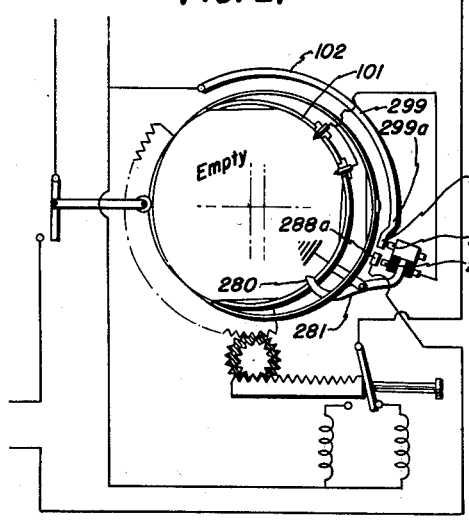
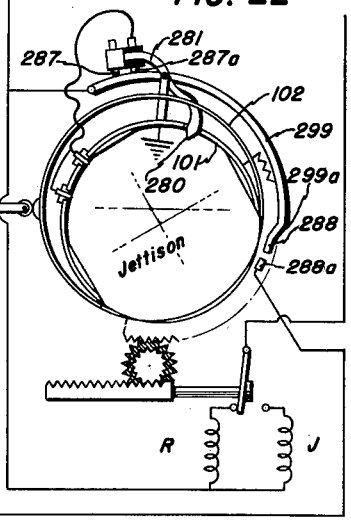
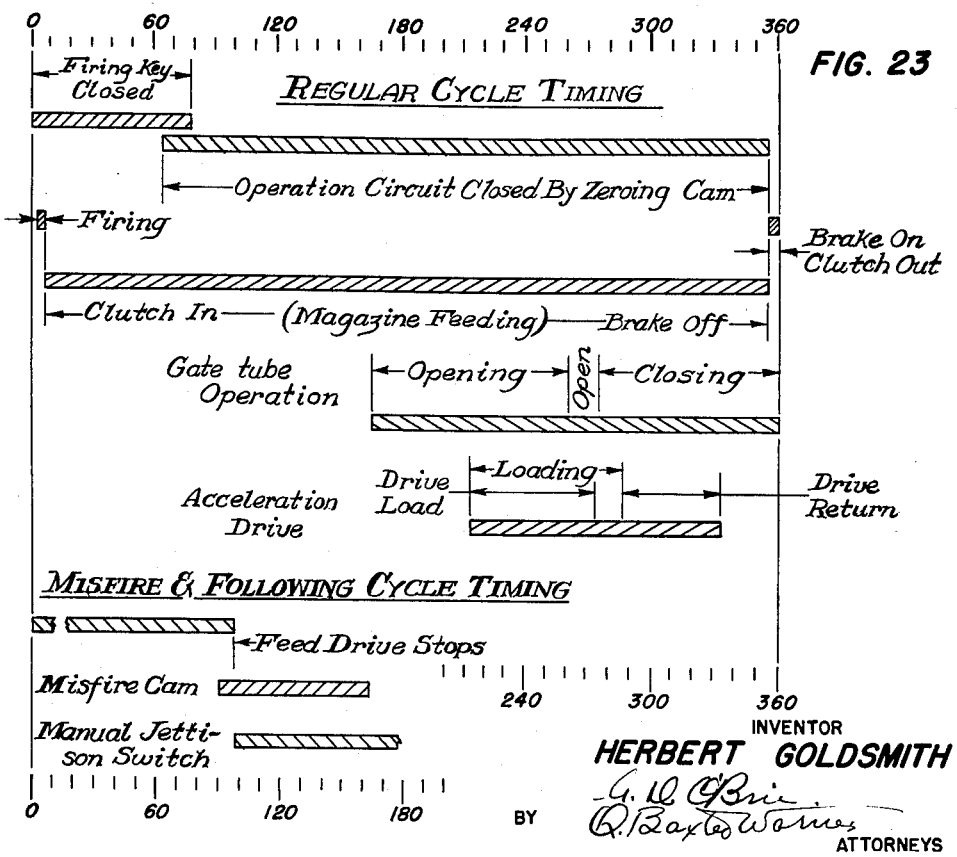
INVENTOR
HERBERT GOLDSMITH
ATTORNEYS

2,993,412
MISSILE LAUNCHER
Herbert Goldsmith, 1368 Van Buren St. NW.,
Washington, D.C.
Original application Feb. 28, 1950, Ser. No. 146,891,
now Patent No. 2,973,691, dated Mar. 7, 1961. Divided and this application July 1, 1952, Ser. No. 296,776
4 Claims. (Cl. 89—1.7)
(Granted under Title 35, U.S. Code (1952), sec. 266)

The present invention is an improvement in missile launchers, and more particularly relates to rocket launchers and automatic feeds therefor, whereby rockets or other missiles may automatically be fed and fired at a predetermined rate, or fed and fired singly, as determined by the operator. This application is a division of my copending application Serial No. 146,891, filed February 28, 1950 for Missile Launcher, now U.S. Patent 2,973,691.

With the increased importance of rockets in naval and military operations, it becomes important to provide a means for automatically firing rockets akin to machine gun and other automatic weapon operation. To this end the present device is provided, essentially, with means for automatically and continuously feeding rockets or other missiles to and loading them into a launching barrel and firing them at a predetermined rate, or firing them singly, as determined by the operator. Under automatic feed and fire, as the feeding and loading mechanisms deliver each rocket to and position it in the launching barrel, the rocket is automatically fired and the barrel prepared for receiving the next rocket as fed thereto and loaded therein by the mechanisms, or under single feed and fire, the operator fires a single rocket as desired and then operates a control means causing another rocket to be fed into the barrel. In addition, the present rocket launcher is provided with means for automatically stopping the automatic feeding and loading of rockets into the launching barrel upon the failure of a rocket positioned therein to fire within a predetermined time, and is further provided with jettisoning means for ejecting such a dud rocket from the launching barrel in order that the mechanism may resume its normal operation.

Although developed primarily for the purpose of launching rockets and although herein described principally in its embodiment as a rocket launcher, many features of the present invention are equally applicable to other embodiments and uses, and it is not intended to limit the scope of the present invention to a rocket or missile launcher.

It is, therefore, one object of the present invention to provide a feeding or conveying mechanism operating in synchronous conjunction with an impelling mechanism to continuously feed objects such as rockets, at a determined and constant rate to the impelling mechanism, which latter mechanism operates to accelerate or impel the objects thus fed thereto; and if desired, a gated receptacle may be provided for receiving said objects, opening and closing in synchronism with the accelerating operation.

It is another object of the present invention to provide for automatic feeding of missiles to, loading them into, and firing them from a launching barrel, the rate of automatic operation being variable as desired.

Another object of this invention is to provide a feeding or conveying mechanism suitable for feeding missiles to a launching barrel at a continuous rate, thereby eliminating shocks and strains to the supporting structure which result from intermittent feeding.

Another object of this invention is to provide a loading means, for accelerating the movement of missiles or other objects fed thereto by the feeding mechanism to insure their proper entry and positioning in a launching barrel or other receptacle, and for opening and closing a launching barrel or other receptacle loading gate in synchronism with the impelling of objects thereto by the loading mechanism, to present an open gate for an object as it is fed thereto and to close said gate after loading.

Another object of the present invention is to provide such a missile launcher with means for deflecting exhaust blast gases and preventing their deleterious leakage from the launching barrel to protect the launcher structure and the operator.

A further object of the present invention is to provide a buffer mounting for the receptacle or missile launching barrel, thereby reducing shocks on the structural supporting frame which would otherwise be imposed by the accelerated movement of a missile or other object being positioned therein.

Another object of the present invention is to provide a complete mechanical interlock of operation between the feeding or conveying and loading mechanisms so that synchronous operation thereof is not affected by maneuvering accelerations of the craft on which the device is mounted. This mechanical interlock is of particular significance when the present device is mounted on aircraft.

Another object of the present invention is to provide for control of the rate of automatic operation of the feeding, loading, and firing mechanisms. The complete interlock of all moving parts enables this control to be established in a single means, namely in the power drive source.

Another object of the present invention is to provide for positively maintaining the missiles or other objects in proper position within the feeding or conveying mechanism magazine and within the receptacle or launching barrel despite acceleration loads that may be imposed thereon due to maneuverings of the craft carrying the present device.

An additional object of the present invention is to provide an electrical firing and operational control system for firing missiles properly positioned in the launching barrel and for controlling the operation of the feeding, loading, and jettisoning mechanisms, the firing circuit thereof being in turn controlled by the loading mechanism to prevent premature firing of a missile before closure of the launching barrel.

Another object of the present invention is to provide for automatically interrupting the operational control circuit to prevent continued feeding of missiles to the loading mechanism when a missile positioned in the launching barrel fails to fire during a predetermined portion of the operational cycle of the present device.

Another object of the present invention is to provide for the jettisoning from the launching barrel of dud missiles, or missiles which have failed to fire within the above-mentioned predetermined portion of the operational cycle, in order that the operation of the present device may be resumed.

An additional object of the present invention is to provide for automatic breaking of the electrical firing circuit during the jettisoning operation to prevent energization thereof during this operation, thereby insuring against the accidental firing of a missile as it is being jettisoned from the launching barrel.

A further object of the present invention is to provide for automatic zeroing of the feeding and loading mechanisms, so that up on deenergization of the firing circuit, the operational control circuit remains energized to continue the feeding and loading of missiles into the launching barrel until a missile has been positioned within said tube and said tube is in readiness for fire, thereby enabling the present mechanism to be in readiness for instantaneous fire.

A further object of the present invention is to provide for both single and automatic feed of objects and single and automatic feed and fire in the case of rockets or other missiles, as desired by the operator.

A still further object of the present invention is to provide means for facilitating the positioning of missiles or other objects in the magazine and insuring against the accidental firing of a missile or the like while such objects are being positioned therein.

In general, the present invention is designed to accomplish the foregoing objects, and in the automatic feed and fire aspect thereof comprises an automatic feeding mechanism, a launching barrel, an automatic loading mechanism, a jettisoning means, a power source for motivating both the feeding and loading mechanisms, the latter two mechanisms being mechanically interlocked for synchronous operation, and an electrical firing and operational control system for firing a rocket positioned within the launching barrel and for controlling the operation of the feeding, loading, and jettisoning means. The feeding mechanism comprises a magazine or rack wherein a plurality of missiles or other objects are positioned and engaged by a plurality of star wheels. Rotation of the star wheels causes movement of the objects along the magazine toward the delivery end of the magazine, the projections of said star wheels causing and controlling the movement of the objects. The star wheels are all actuated by a single power source, and their movement is maintained in synchronism by suitable means such as a chain and sprocket drive. The launching barrel comprises an inner guide tube and an outer gate tube mounted for relative rotation at the delivery end of the feeding mechanism magazine, into which the missiles are positioned by the loading mechanism, and from which they are launched upon being fired by the firing circuit. The guide tube is designed to substantially enclose a missile positioned therein except for an elongated opening forming a loading gate which in the normal operation of the present rocket launcher is directed toward the delivery end of the feeding mechanism and through which the missiles are loaded into the tube. The loading mechanism comprises essentially two portions: one being an acceleration portion for accelerating the movement of the last missile being fed by the magazine in order to insure the entry thereof into the guide tube and its proper positioning therein; the other being a gate tube actuating portion, operating in synchronism with the acceleration portion for closing the afore-mentioned elongated opening or loading gate in the guide tube after a missile has been positioned therein and before it has been fired or launched therefrom, and for opening the same after a missile positioned in said guide tube has been fired to permit the entry of another missile as it is directed thereto by the acceleration portion of the loading mechanism. The acceleration portion comprises the last star wheels at the delivery end of the magazine, which are mounted thereon for rotational movement, as controlled by the afore-mentioned chain drive, and for reciprocatory motion therealong in synchronism with the operation of the gate tube portion, thereby imparting an accelerated movement to the missiles as they reach the delivery end of the magazine to insure their proper entry into the guide tube. The gate tube portion comprises a tube mounted on and rotatable about the guide tube, likewise having an elongated opening therein substantially the same size as that in the guide tube. The synchronous operation between the gate tube and the accelerating mechanism is such that upon the firing of a missile positioned in the guide tube and as another missile is accelerated from the magazine thereto, the opening in the gate tube is brought into coincidence with the corresponding opening in the guide tube by rotation of the former about the latter to present an open loading gate; and upon completion of the loading operation, the gate tube is again rotated to bring its opening out of coincidence with that in the guide tube to close the loading gate, thereby forming a complete enclosure for the missile before it is fired. The power source for the mechanical operations of the feeding and loading mechanisms comprises any suitable variable speed motor which operates upon these mechanically interlocked mechanisms to drive them at synchronized rates of operation, as determined by the characteristics of the interlock therebetween. The jettisoning means comprises a rack and gear arrangement operating to rotate the guide tube. If a dud missile is positioned in the launching barrel and it is desired to eject the same therefrom in order that operation of the device may be resumed, energization of the jettisoning means causes a rotation of the guide tube to bring the gate opening therein into registry with the corresponding opening in the gate tube, the gate tube being then positioned to close the loading gate with its opening directed away from the feeding magazine, thereby enabling the ejection of the dud missile through the registered openings. The electrical firing and operational control system operates through its operational control circuit simultaneously upon a clutch and a brake on the drive shaft for the feeding and loading mechanisms to initiate and to continue or to stop the operation thereof, and while operating the same to automatically fire the missiles through its firing circuit as they are positioned within the guide tube and after the loading gate is closed. If during operation of the present device a dud missile is positioned within the barrel, an automatic cutoff operates upon the operational control circuit to cause the feeding and loading mechanisms to cease operation until the dud missile has been jettisoned and the guide tube returned to its normal operating position.

In the nonautomatic or single feed and fire aspect of the present invention, the sole change in design resides in the electrical firing and operational control circuit, otherwise the device being the same in its structure and function as above described for the automatic feed and fire aspect. To effectuate the nonautomatic operation, the electrical firing and operational control circuits are independently energized. Thus, a missile positioned within the launching barrel is fired without initiating the feeding and loading mechanisms, and when the launching barrel is empty the operational control circuit is energized to feed a single missile into the launching barrel while the firing circuit remains inactive, thereby preventing the firing of the missile until desired and thus obtaining a single cycle operation of the present missile launcher and its associated feeding and loading mechanisms.

A full understanding of the present invention can be best had by a consideration of the following detailed description thereof, directed by way of example to an embodiment suitable for launching rockets, and made in conjunction with the accompanying drawings in which like numerals refer to similar or corresponding parts and wherein;

FIG. 2a is an end view of a flexible coupling taken along line 2a—2a of FIG. 2;

FIG. 2b is a vertical sectional view of the flexible coupling taken along line 2b—2b of FIG. 2a;

FIG. 6 is a longitudinal section through the feeding mechanism portion of the launcher and taken along a line substantially corresponding to line 6—6 of FIG. 3;

Figure 1:
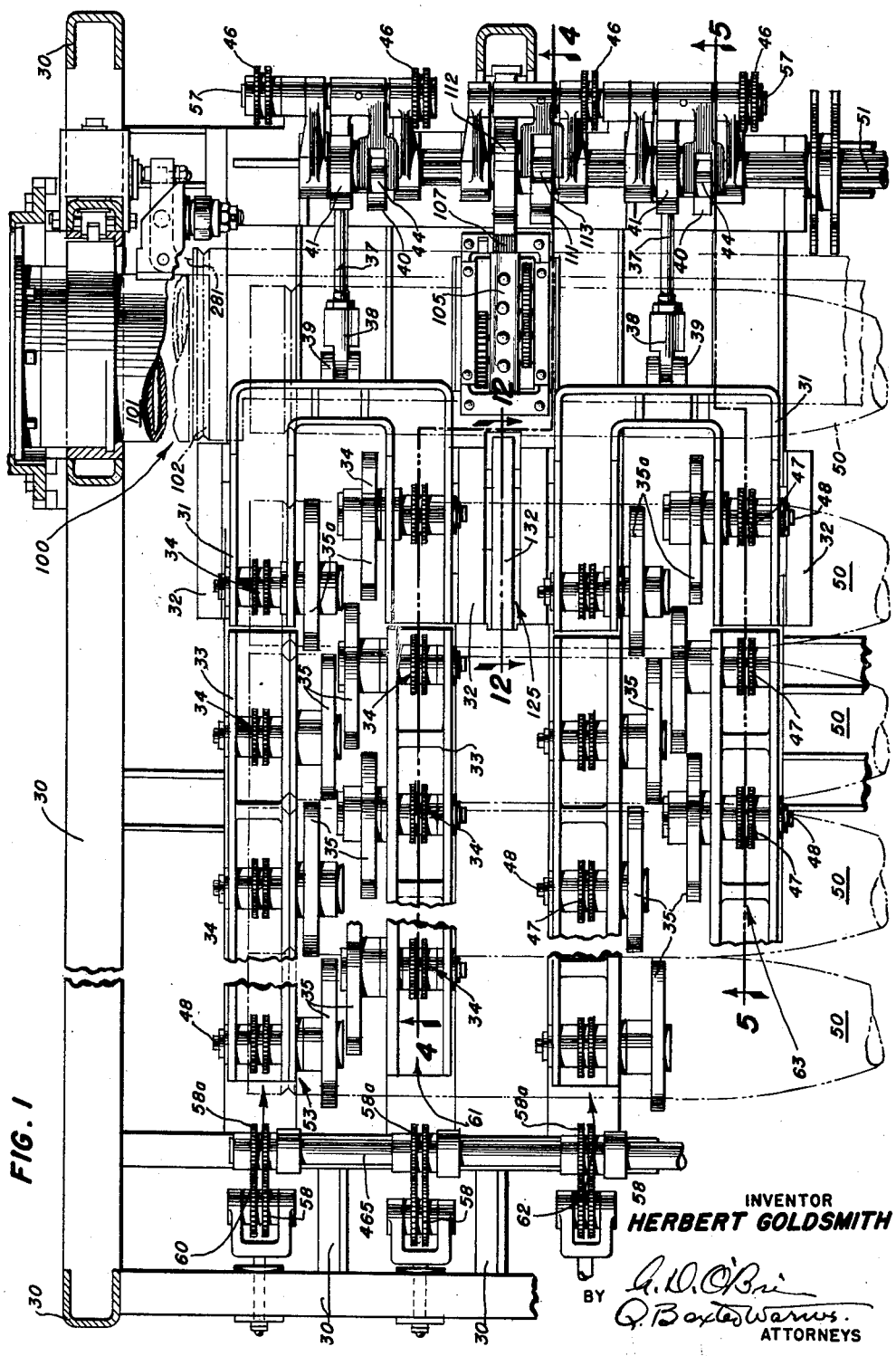
FIG. 1 is a bottom plan view of a rocket launcher embodying the present invention, a portion being broken away.
Figure 2:
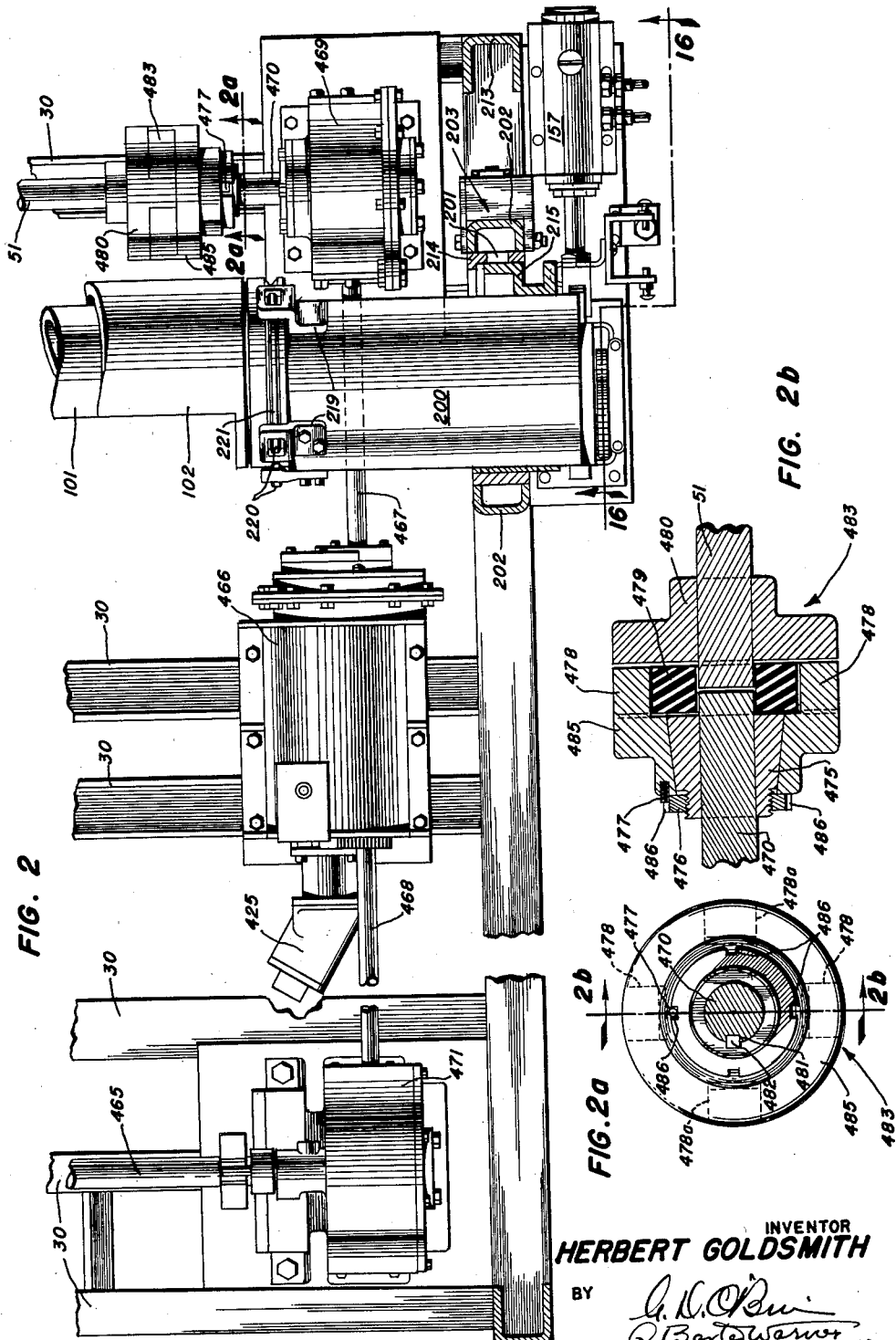
FIG. 2 is a top view of the power drive system for the feeding and loading mechanisms, these mechanisms having been removed to reveal the system.
Figure 10:
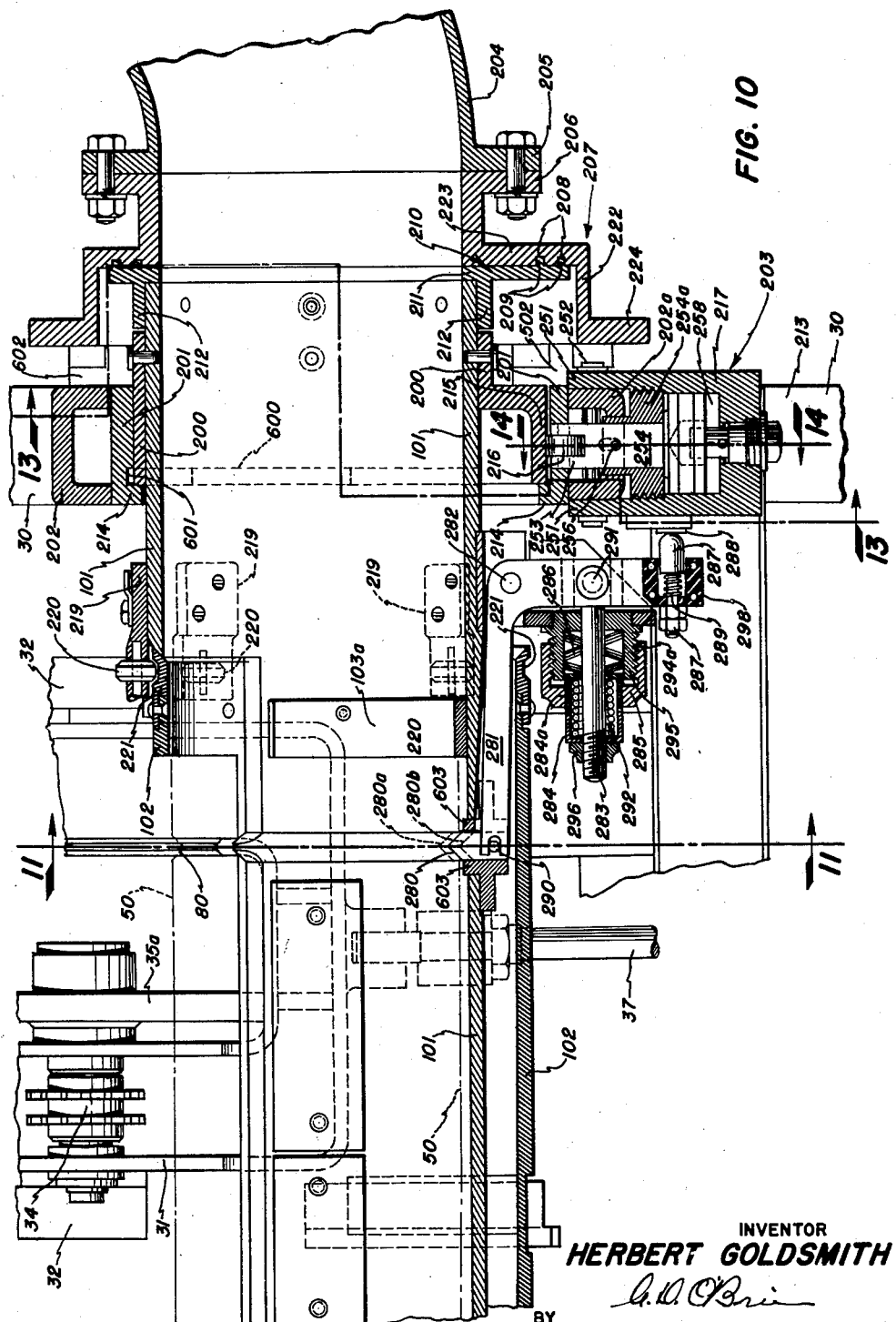
Figure 11:
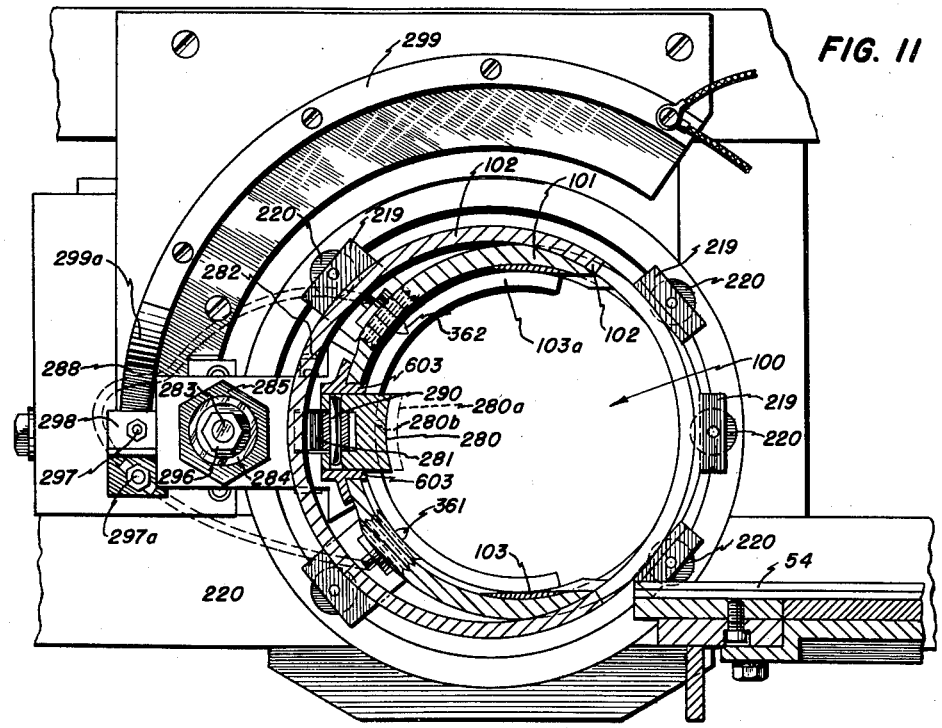
Figure 12:
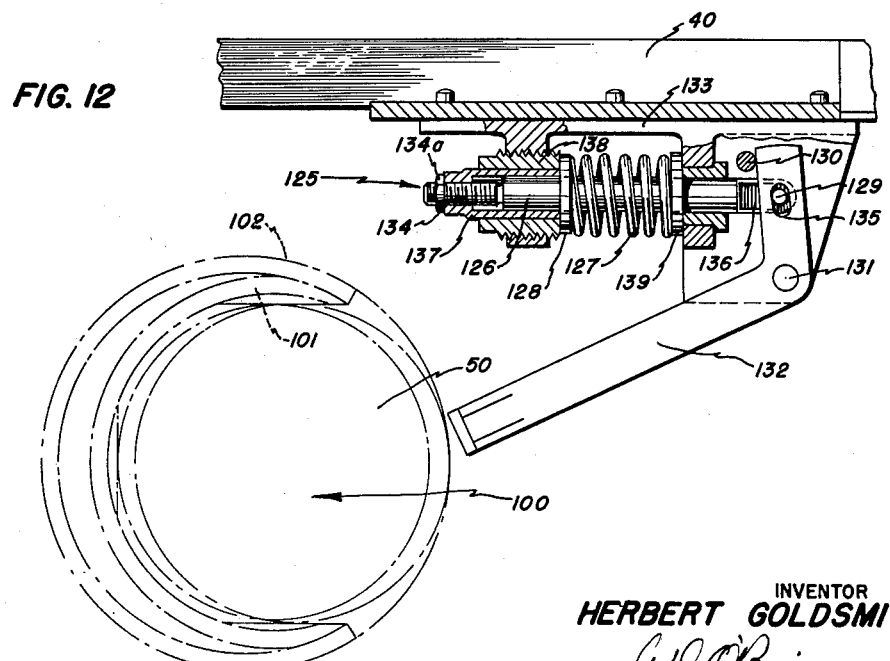
Figure 13:
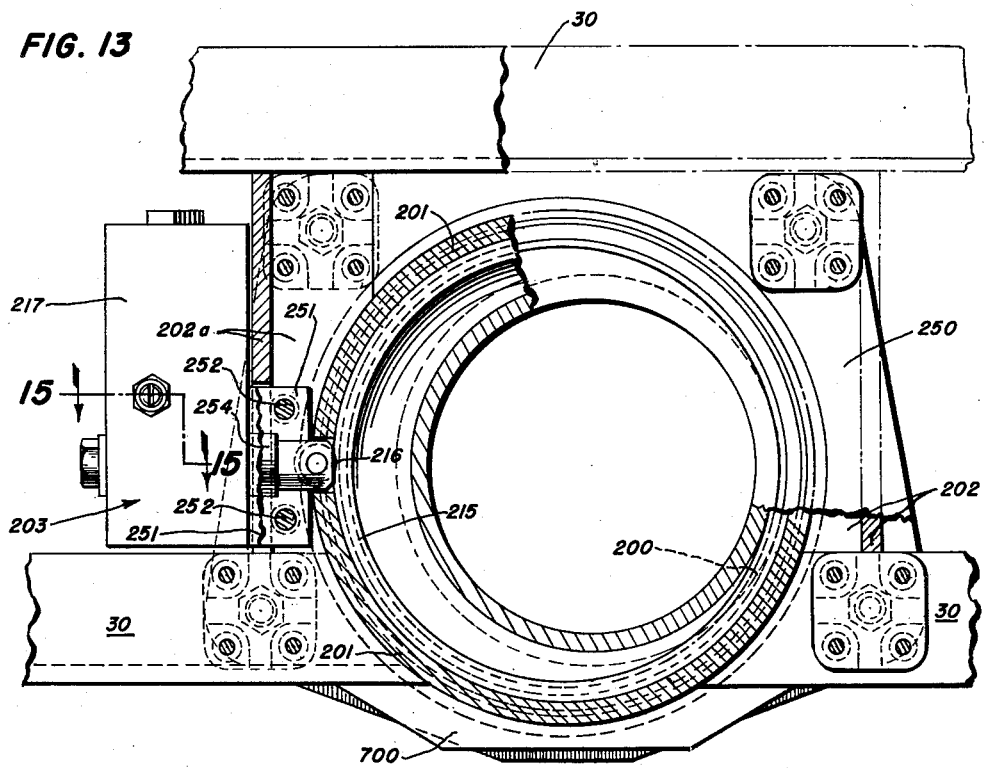
Figure 14:
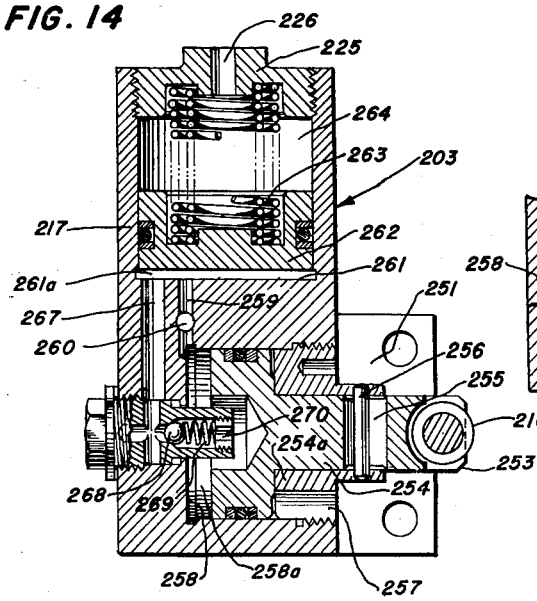
Figure 15:
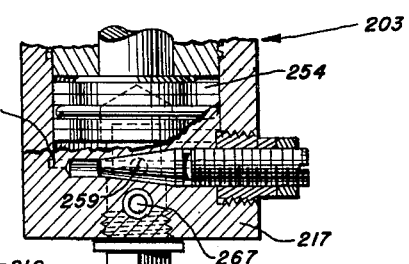
Figure 16:
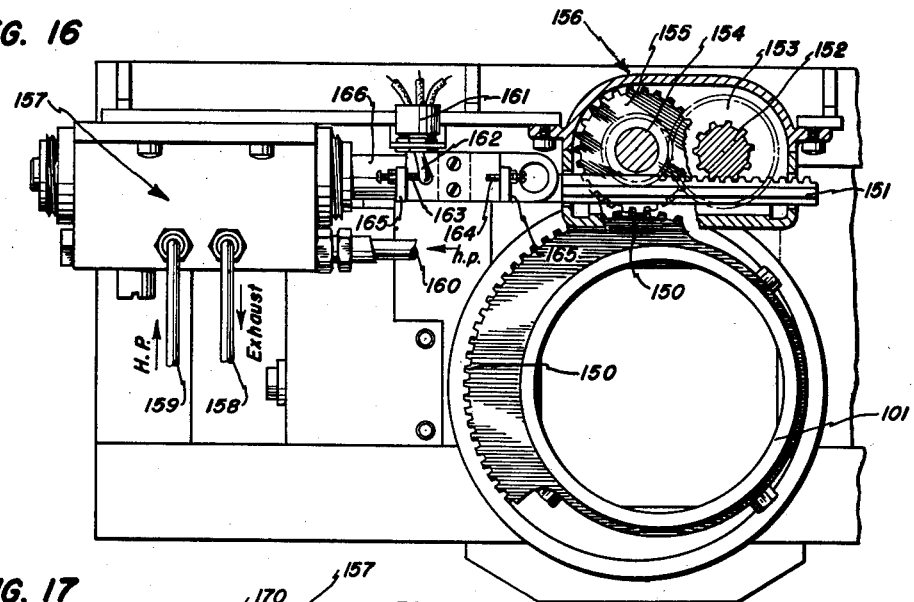
Figure 17:
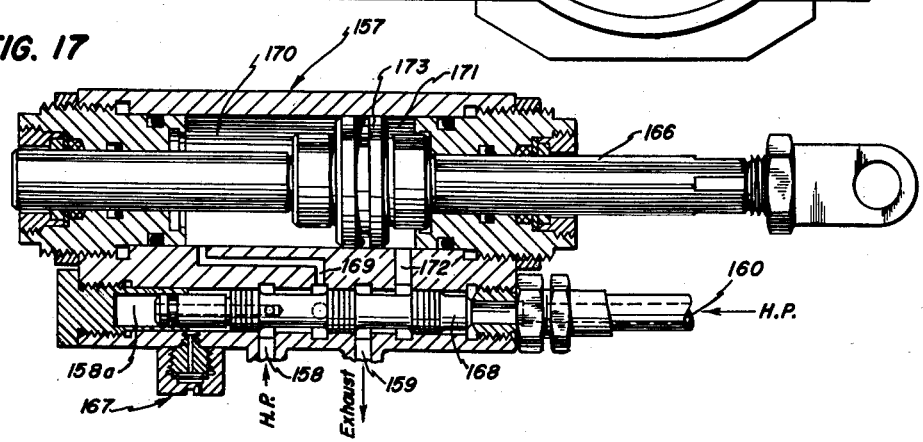
Figure 18:
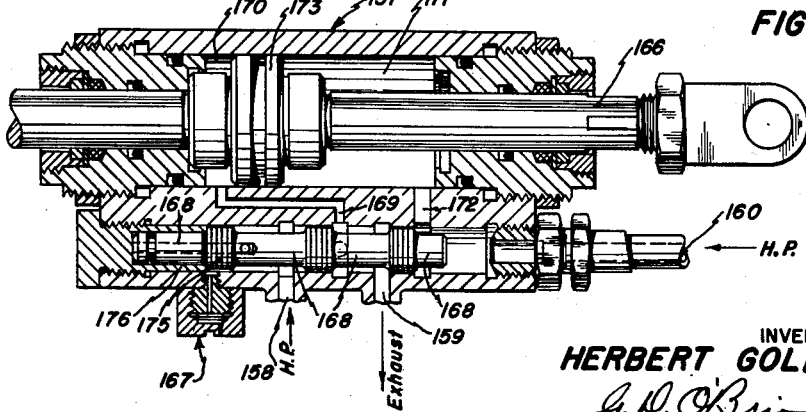
Figure 19:
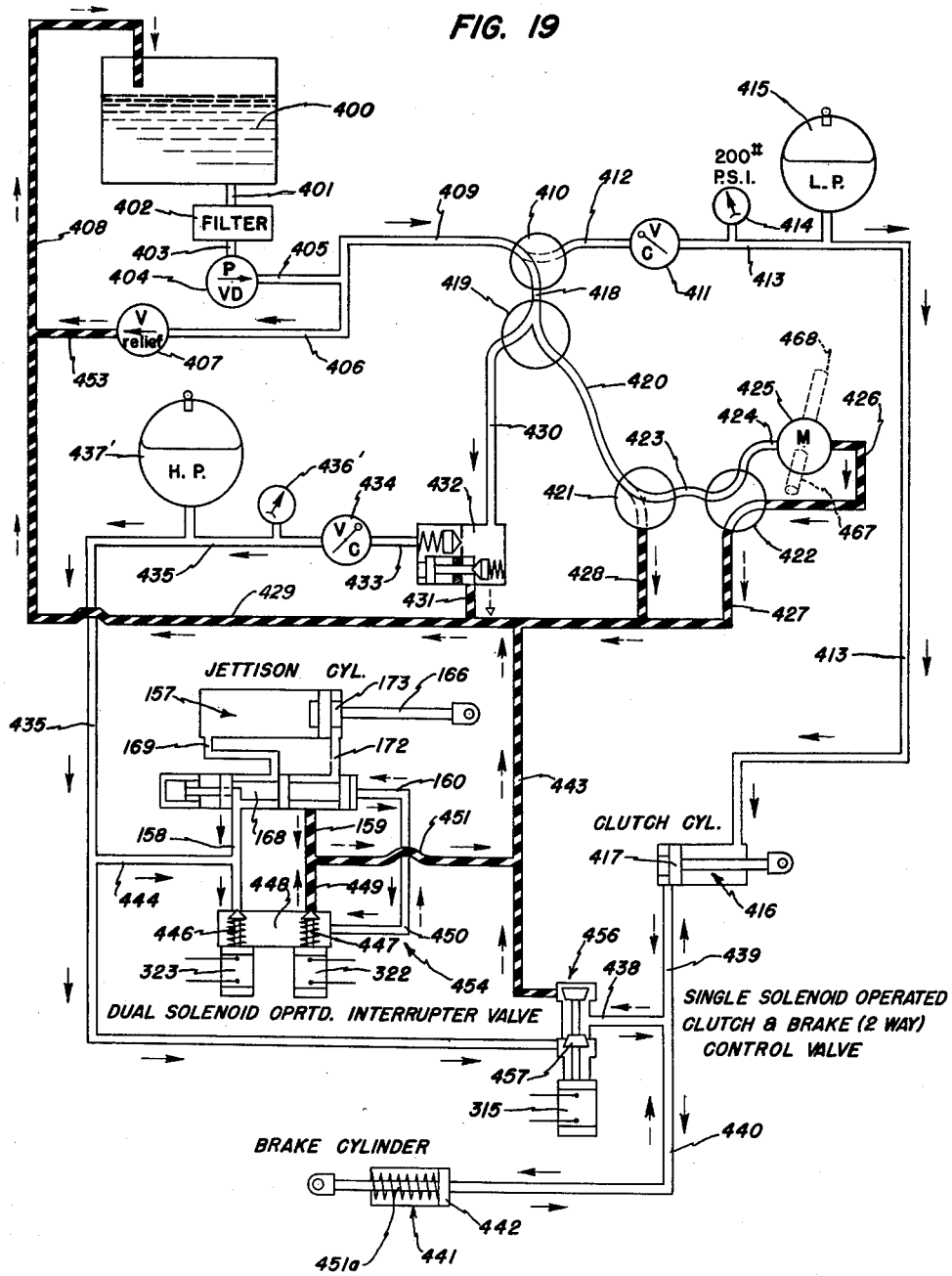
Figure 20:
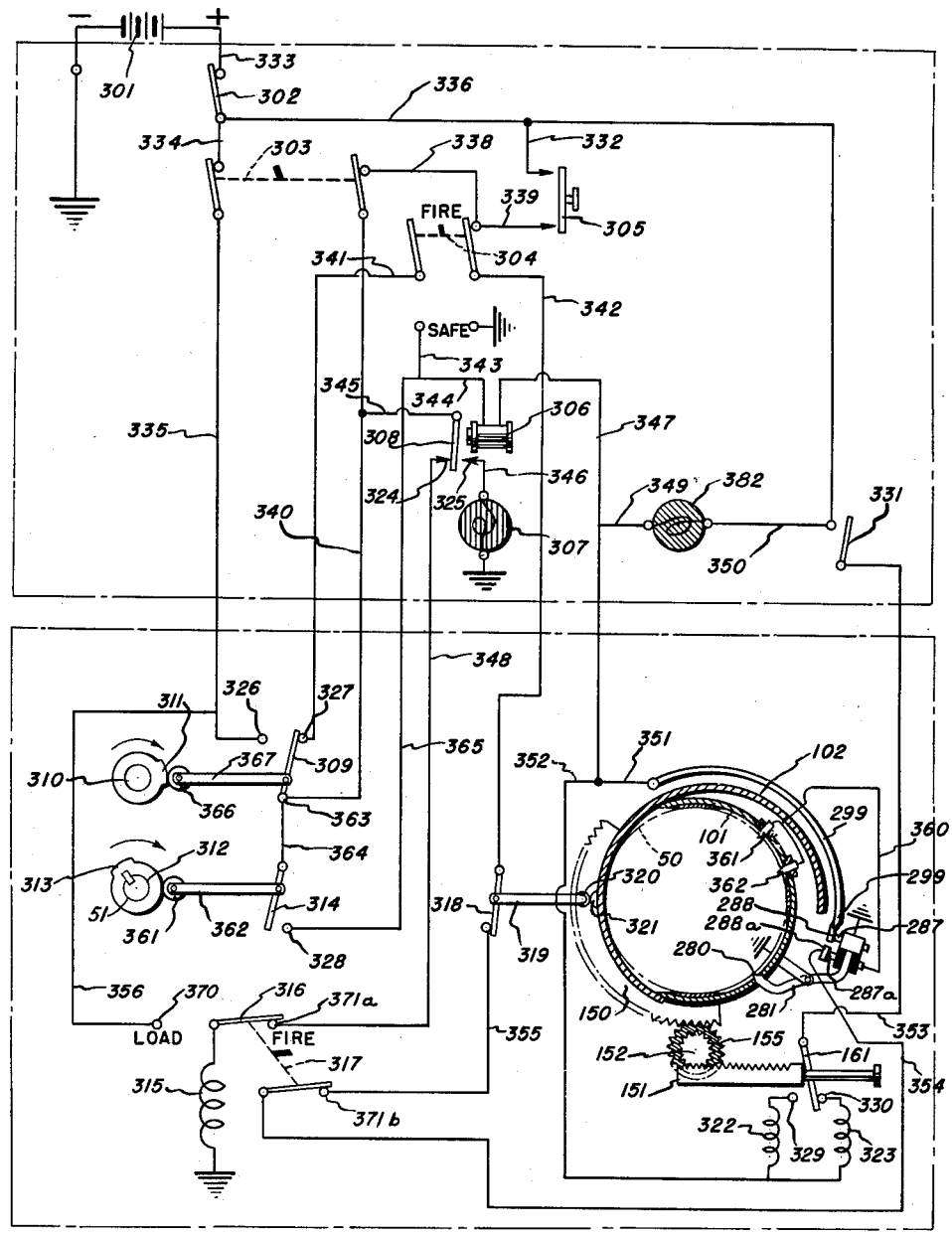

FIGS. 7, 8, and 9 are vertical cross-sectional schematic views of the guide and gate tube in their several positions, loading, firing, and jettisoning respectively;

FIG. 10 is an enlarged detailed horizontal longitudinal section of the rear or exhaust end of the guide and gate tubes and their mounting structure;

FIG. 11 is a vertical cross section through the guide and gate tubes in loading position and taken along a line substantially corresponding to line 11—11 of FIG. 10;

FIG. 12 is a vertical section of a safety latch taken along a line substantially corresponding to line 12—12 of FIG. 1;

FIG. 13 is a vertical cross-sectional view of the guide and gate tubes and mounting therefor taken along a line substantially corresponding to line 13—13 of FIG. 10;

FIG. 14 is a vertical section of the buffer mechanism taken along a line substantially corresponding to line 14—14 of FIG. 10;

FIG. 15 is a horizontal cross-sectional view of one of buffer mechanisms taken along the line 15—15 of FIG. 13;

FIG. 16 is a end view partially in section showing the guide tube and the jettisoning mechanism and taken along a line substantially corresponding to line 16—16 of FIG. 2;

FIGS. 17 and 18 are longitudinal sections of the jettisoning cylinder, showing it in two operative positions;

FIG. 19 is a schematic view of the hydraulic system of the present invention;

FIG. 20 is a schematic wiring diagram of the electrical firing and operational control system with the guide and gate tubes in "loaded" position ready to fire;

FIG. 21 is a view of a portion of FIG. 20 showing the guide and gate tubes in loading position;

FIG. 22 is similar to FIG. 21 but shows the tubes in jettisoning position; and

FIG. 23 is a cycle timing chart showing the time relationships of the various parts during a complete cycle of operation of the present invention.

Feeding and loading systems

Figure 3:
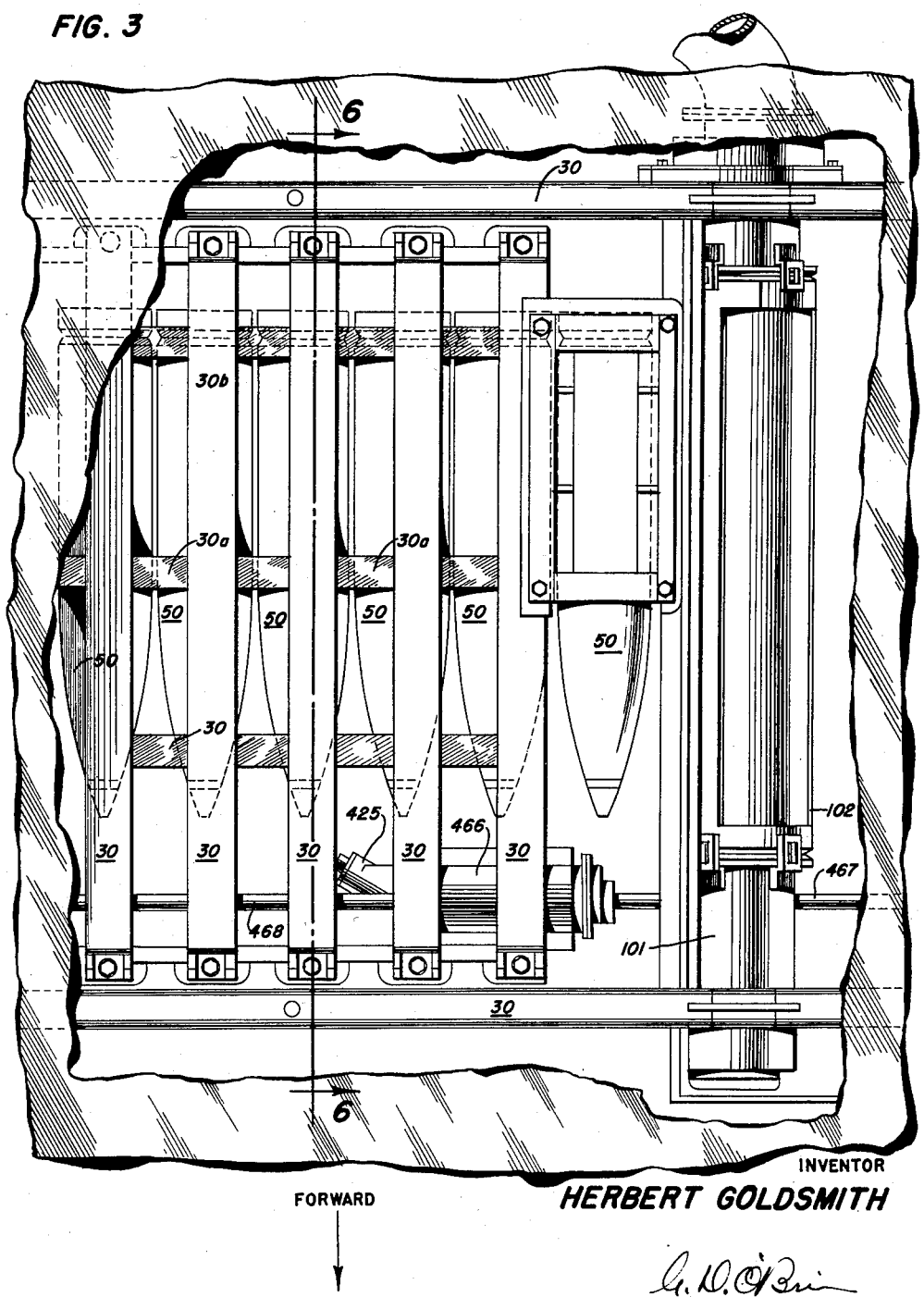
FIG. 3 is a bottom plan view taken from below the rocket launcher showing the rocket magazine, the rockets loaded therein, and the guide and gate tubes.

The rocket magazine of the present rocket launcher, in the embodiment shown in the accompanying drawings, comprises a lattice frame of structural beams indicated by the numerals 30, 30a, 30b, and 30c. Referring particularly to FIGS. 3 and 6, a plurality of rockets 50 are positioned within the magazine defined by the above-mentioned structure and, as mentioned above, are caused during the operation of the launcher to be advanced along the magazine toward the guide tube 101, into which they are fed by the loading mechanism, and from which they are fired. In order to guide the rockets in their movement along the magazine, two of the bottom beams 30a and 30b are provided with rails, beam 30a carrying the rail 56 upon which the forward ends of the rockets bear in their movement along the magazine, and beam 30b carrying the rail 54 which engages the rear ends of the rockets. The bases of the various rockets are each provided with the circumferential grooves 53 designed to engage the rail 54. Rails 54 and 56 are positioned along the face of the magazine which would normally be the bottom thereof, while opposite therefrom on the top face of the magazine are the rails 56a and 54a carried by two of the beams indicated by the numeral 30c cooperating with the rails 56 and 54 respectively, rail 54a like 54 engaging the circumferential grooves 53 of the rockets, thus holding a rocket positioned within the magazine against longitudinal movement.

The feeding mechanism is mounted within the magazine and serves to advance the rockets in unison toward the launching barrel. In the embodiment shown, the feeding mechanism comprises four substantially identical rocket advancing systems indicated generally in FIGS. 1 and 6 by the numerals 60, 61, 62, and 63, two being located adjacent the heads of the rockets and two being located adjacent the bases of the rockets. Each rocket advancing system comprises an endless chain drive 45 (FIGS. 4 and 5) supported between idler sprockets 46 at one side of the rocket launcher and idler sprockets 58 at the other side thereof and driven by the drive sprockets 58a (FIG. 1). The lower portion of these chains 45 engage and rotate a plurality of star wheel sprockets 47, each of which is carried by its respective stub shaft 48, while the chains are kept in full engagement with the teeth of the several sprockets by means of the guide blocks 52, one for each sprocket. A star wheel 35 is mounted upon each stub shaft 48 for rotation therewith. All the star wheels 35 impelled by a particular chain drive 45 are thus maintained in synchronous angular position and rotational movement, rotation thereof causing the rockets 50 to advance along the magazine, as impelled by the projections of the star wheels, toward the launcher barrel generally denoted by the numeral 100. All of the drive sprockets 58a are driven by a main drive shaft 465, rotation of which results in identical movement of the various chain drives 45 and of all the star wheels 35, thereby insuring the desired and proper advance of all the rockets in the magazine as controlled by the various star wheels. Thus in the operation of the feeding mechanism, rotation of shaft 465 impels in identical movement the several endless chain drives 45 to rotate the star wheels 35 through drive sprockets 58a, advancing all the rockets in the magazine in unison toward the launching barrel 100.

Figure 5:
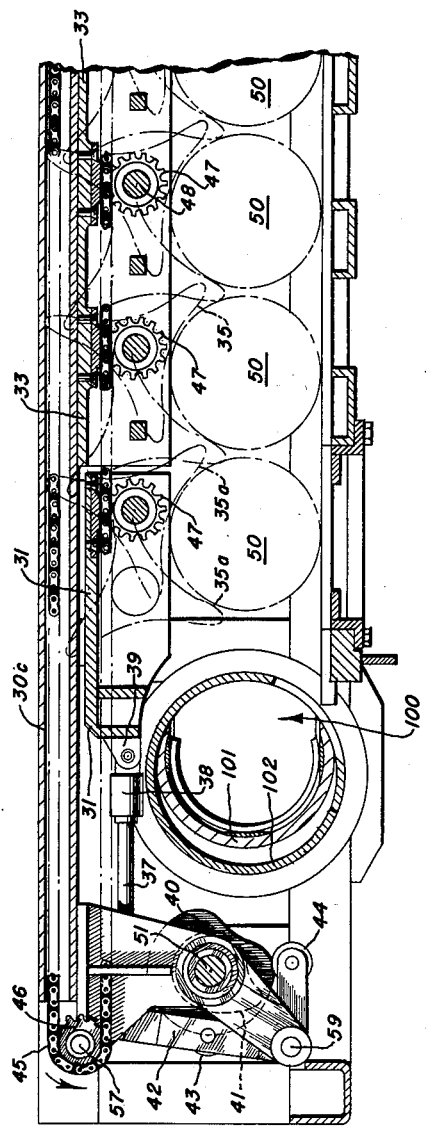
FIG. 5 is a smaller view taken along a line substantially corresponding to line 5—5 of FIG. 1.

As mentioned in the introduction, the loading system has two portions, the feed accelerating portion, whereby the feed of the rocket closest to the launching barrel is accelerated over the feed of the remainder of the rockets and the loading gate portion, by means of which a guide tube gate is rapidly opened and closed in timed relation to the accelerated feed. Considering first the accelerating portion, and referring particularly to FIGS. 1 and 5, it includes the last star wheel 35a of each of the four rocket advancing systems and the sprockets and shafts associated therewith, as in the case of each of the other star wheels 35, and further includes the two substantially U-shaped yokes 31 upon which the star wheels 35a are rotatably mounted. These U-shaped yokes are slidably mounted for reciprocatory movement in any suitable manner, as for example by the bearing blocks 32. Each of said yokes 31 is linked to a separate bell crank 42, only one of which is shown in FIG. 5, by linkage elements 37 and 38, and each bell crank is controlled by its pair of operating cams 40 and 41. The cams 40 and 41 are keyed to the drive shaft 51, and as it rotates it simultaneously drives these cams whose surfaces bear against the bearing wheels 43 and 44 rotatably mounted on the bell cranks 42. Rotation of the cams 40 and 41 results in an oscillatory movement of the bell cranks 42 which in turn, through the linkage element 37 and 38, drive the two yokes 31 in synchronous reciprocation along the blocks 32.

Since the last star wheels 35a of each rocket advancing system and their associated stug shafts and sprockets are mounted on the yokes 31 for reciprocation therewith, as the rotation of cams 40 and 41 causes a movement of yokes 31 to the left from the position as shown in FIG. 5, the movement of the star wheels 35a mounted thereon and their associated shafts and sprockets is in the opposite direction from the operating travel of the chain drive, therefore resulting in an increased rotational velocity of these star wheels, and causing an acceleration of the rate of movement of the last rocket in the magazine, under the control of these star wheels, as it is fed toward the launching barrel 100. Thus, as shaft 51 is caused to undergo one complete revolution, the yokes 31 undergo in unison one complete reciprocatory cycle, resulting in an acceleration of the feeding rate of the last rocket approaching the launcher 100 through the accelerated rotational velocity of the star wheels 35a, to impel the rocket into the launching barrel and then a return of these last star wheels 35a to their starting position to receive the next rocket fed thereto to similarly impel the same into the launching barrel, the first mentioned rocket positioned therein having in the meanwhile been fired, as will be described in detail below.

Considering the combined operation of the feeding mechanism and the acceleration portion of the loading mechanism, rotation of shaft 465 causes a uniform advance of all the rockets in the magazine at a constant rate as controlled by the rotation of the star wheels 35, while the rotation of shaft 51 rotates the cams 40 and 41 and results in a reciprocatory movement of the group of last star wheels 35a to impel each rocket fed thereto by the preceding star wheels 35 into the launching barrel 100. As each rocket is being impelled into the launching barrel, the preceding star wheels 35 continue the uniform advance of all the following rockets in the magazine. Thus, the combination of the presently described acceleration portion of the loading mechanism and the feeding mechanism results in a continuous feed of rockets to the launching barrel 100 at a uniform rate except for the final accelerated impetus imparted to each rocket as it is loaded into the launching barrel, thereby minimizing and substantially eliminating the stresses and strains that would be imparted to the entire rocket launching mechanism and the supporting structure therefore as a result of an intermittent feed of rockets.

Figure 4:
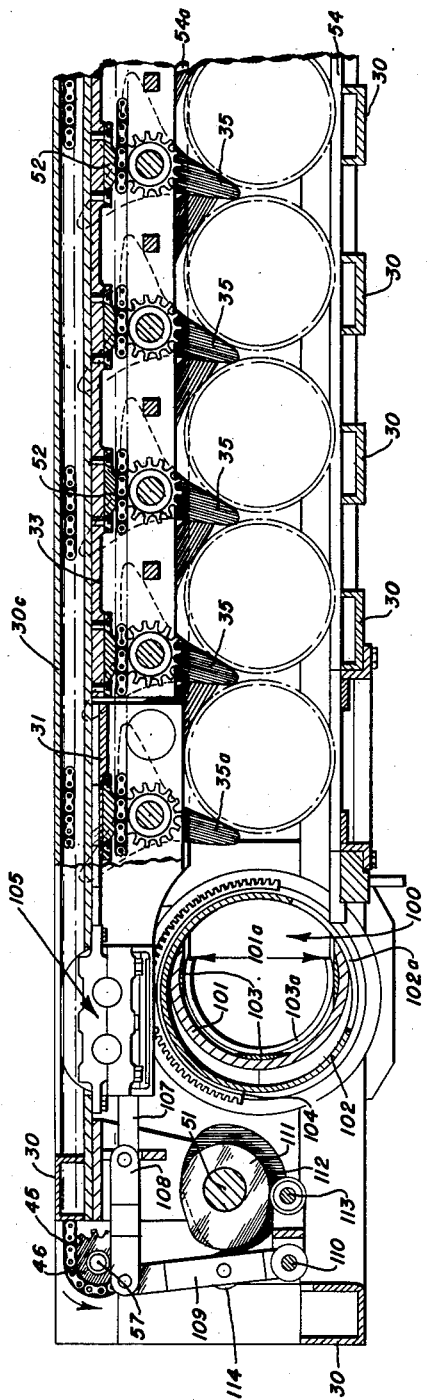
FIG. 4 is a transverse section through the rocket launcher taken along a line substantially corresponding to line 4—4 of FIG. 1.

Considering, next, the gate portion of the loading mechanism, and referring particularly to FIG. 4, the launching barrel 100 comprises an inner guide tube 101, having an elongated opening 101a therein of sufficient size to permit the passage of a rocket therethrough, and a gate tube 102 rotatable about tube 101, the gate tube having an opening 102a therein corresponding in size to the opening 101a and an arcuate gear section 104 extending over a portion of the circumference thereof. This gate portion also includes the cams 111 and 112 keyed to the shaft 51, the bell crank 109 pivotable about the shaft 110 and having the bearing rollers 113 and 114 mounted thereon for engagement with the surfaces of cams 111 and 112 respectively, and a suitable rack and gear arrangement at 105 connected to the bell crank 109 by the linkages 107 and 108 and cooperating with the gear sector 104 to rotate the outer gate tube 102 about the inner guide tube 101 as controlled by the cams 111 and 112. The shaft 51 drives both the pair of cams 40 and 41, which controls the acceleration portion of the loading mechanism, and the pair of cams 111 and 112, which controls the gate portion thereof. Thus, with these two pairs of cams properly keyed to the shaft 51, the gate tube 102 is operated in synchronism with the operation of the last star wheels 35a. The cams 111 and 112 oscillate the bell crank 109 causing the gate tube 102, through the gear sector 104 and the rack and gear arrangement 105, to rotate about the guide tube 101 and alternately to bring the two openings therein into and out of registry. When the two openings are in registry and in alignment with the magazine, the launching barrel 100 is ready to receive a rocket, and upon the loading of a rocket the guide tube remains stationary while the gate tube 102 is rotated to bring its opening out of registry with that in the guide tube, thereby forming a complete enclosure for the rocket positioned within the launching barrel and it is then in readiness for firing. After a rocket thus loaded has been fired, the gate tube 102 is rotated to again bring the openings in the two tubes 101 and 102 into registry and the operation is repeated. This entire cycle of operation of the gate tube is controlled by the cams 111 and 112 operating upon bell crank 109 and is accomplished during one complete revolution of the shaft 51. Thus, as the rockets are fed at a steady rate along the magazine under control of the star wheels 35, as driven by the shaft 465, the acceleration portion of the loading mechanism is operated by the cams 40 and 41 as impelled by the shaft 51 to apply an acceleration impetus to the last rocket as fed by the star wheels 35 to the group of last star wheels 35a. Synchronously with the acceleration impetus, the cams 111 and 112 likewise impelled by the shaft 51 operate through bell crank 109 to bring the openings in the tubes 101 and 102 into registry, registry between the two openings being obtained as the rocket being delivered under the control of the star wheels 35a is being accelerated and impelled into the guide tube 101, and upon being positioned therein said openings are moved out of registry to completely enclose the rocket before it is fired.

Through the positive mechanical interlock arrangement above-described, the feeding and loading mechanisms are operated in synchronism despite loads that may be imposed by the maneuverings of the craft upon which the present launcher is positioned, this being of particular importance when the present rocket launcher is mounted upon an aircraft because of the particularly great inertia forces that may result from the maneuvering of such craft. To more fully understand this interlock, the power drive system of the above-considered structures will be here considered in detail with particular reference to FIGS. 2, 2a, and 2b. As will be considered in detail in the section entitled "Hydraulic System," a hydraulic motor 425 operates through the gear box 466 to rotate oppositely extending shafts 467 and 468. Shaft 468 is connected to the gear box 471, through which it drives shaft 465 by means of a suitable gear arrangement, such as a worm gear. Shaft 465 is the star wheel drive shaft and rotates the feeding mechanism, as discussed in detail above. The other shaft 467 driven by motor 425 through the gear box 466 is connected to the gear box 469 through which it drives the shaft 470 by means of a suitable gear arrangement, such as a worm gear, shaft 470 being in turn connected to shaft 51 through the flexible coupling 483. Shaft 51 is the cam drive shaft which controls the operation of the loading mechanisms, as discussed in detail above. Thus, the two shafts 465 and 51, driving respectively the feeding and loading mechanisms, are driven by a single power source, namely the hydraulic motor 425, and are driven at a predetermined ratio of speed with respect to each other as controlled by the gear boxes 466, 471, and 469, thereby attaining a positive ratio of rotation between the shafts 51 and 465 through the mechanical shaft and gear interlock here described.

The flexible coupling 483, mentioned in the preceding paragraph as joining shafts 470 and 51, is shown in detail in FIGS. 2a and 2b and is formed of two sides, one side comprising the two elements 475 and 485 secured to shaft 470, the other side comprising the element 480 secured to shaft 51. The shaft 470 is keyed to the conical coupling element 475 through key 482 and keyway 481, while shaft 51 is keyed in a similar manner to the coupling element 480. The internal conical coupling 475 is fitted into the external conical coupling 485, thus juxtaposing their conical surfaces. Positive gripping engagement between the two surfaces is maintained by the internally threaded locking ring 476 carried by an externally threaded shoulder of the coupling element 475, which is held in clamping position by a set screw 477 carried by the coupling member 485 and engaging one of recesses 486 in the ring 476. The usual rubber or other resilient cushioning element 479 carried between two extending lugs 478 on element 485 and the two corresponding lugs 478a on coupling element 480 provides a cushioned drive connection between the coupled parts.

In order to establish the desired relation between the feeding and loading cycles, it is necessary that the angular adjustment of shaft 51 be at a specific relative position with respect to shaft 465. The flexible coupling 483 permits adjustment between shafts 51 and 470 in order to provide the desired relative angular position as between the shafts 51 and 465, which adjustment is attained by removing the set screw 477 and loosening the locking ring 476, thereby permitting loosening of the conical bearing surfaces between coupling elements 475 and 485. This being done, shaft 51 may be rotated with respect to shaft 470 until the desired relative angular position or cyclic position between shafts 51 and 465 is attained. Once this adjustment is made, the shafts 470 and 51 are then coupled to prevent relative rotation therebetween by tightening the ring 476 on the threaded portion of the coupling element 475, thus bringing the conical surfaces of coupling elements 475 and 485 into frictional engagement, and then inserting the set screw 477 into the coupling member 485 to prevent rotation and loosening of the ring 476. Operation of hydraulic motor 425 then impels the drive shafts 51 and 465 at a predetermined relative speed of rotation through the mechanical interlock described above, thereby effecting the desired synchronized operation of the feeding and loading mechanisms of the rocket launcher.

To prevent a rocket loaded in the launching barrel from bouncing back out through the loading opening before it is closed, as might result from the acceleration impetus applied to said rocket or from maneuverings of an aircraft upon which the launcher may be positioned, there is provided a rocket retaining arm generally indicated by the numeral 125, which is shown in situ in FIG. 1 located adjacent the launching barrel 100 and between the rocket advancing systems 61 and 62. As shown in FIG. 12, the rocket retaining arm comprises a bracket 133 secured to the undersurface of the upper structural frame of the magazine, a rod 126 reciprocable in said bracket and having a threaded extension 134 at one end and a pin 129 extending transversely through a narrowed portion 136 formed at its other end, an elbow arm 132 pivotally mounted on the bracket by pin 131 and having its short end bifurcated to embrace the narrow portion 136, the pin 129 being slideable in an elongated slot 135 formed in the bifurcated portion, a helical spring 127 encompassing a portion of the rod 126 and enclosed between the two washers 128 and 139 riding on rod 126, a spring tension adjustment sleeve 137 threaded onto the threaded rod extension 134, a lock nut 134a carried by the threaded extension 134 for securing sleeve 137 in adjusted position, and a threaded bushing 138 carried by the bracket 133 for slidably carrying the spring adjustment sleeve 137. In operation, as a rocket 50 is fed into the launcher 100 it passes under the elbow arm 132, from right to left as shown in FIG. 12, forcing it upwardly and causing it to pivot about its pivot point 131, resulting through its connection to the rod 126 in a movement of the rod from left to right in the view shown in FIG. 12. This movement of rod 126 causes a corresponding movement of sleeve 137 against washer 128 resulting in a compression of the helical spring 127. When the rocket 50 has entered the launching barrel 100 and clears the end of arm 132, the compressed spring 127 by the pressure exerted on washer 128 forces the sleeve 137, rod 126, and arm 132 to their starting positions, as shown in FIG. 12, to effectively prevent return of the rocket from the launching barrel before the loading gate has been closed. A stop 130 on the bracket 133 limits the return stroke of rod 126 to insure proper positioning of arm 132 when at rest.

*Launching and jettisoning mechanisms*

The launching mechanism of the present device operates in conjunction with the above-described feeding and loading mechanism. The launching barrel indicated generally by the numeral 100 essentially comprises two tubes, one within the other, the inner guide tube 101 having the rocket bearing or guide strips 103 extending substantially the length thereof and the rear stop 103a affixed to the exhaust end thereof, and the outer gate tube 102 circumscribing tube 101. Generally, in the operation of loading and firing a rocket the launching barrel operates in the following manner, as illustrated in FIGS. 7 and 8; as the loading mechanism accelerates a rocket and impells it into the barrel 100, the guide tube 101 and the gate tube 102 are in the position shown in FIG. 7, that is, the openings 101a and 102a of the two tubes are in registry and directed toward the rocket magazine forming a rocket admitting opening; after the loading mechanism has impelled a rocket into position in the guide tube, the gate tube 102 rotates about the guide tube 101 into the position shown in FIG. 8, so as to close the rocket admitting opening and thereby provide an enclosed launching barrel. FIG. 9 shows the jettisoning position of the launching mechanism which may be attained when a rocket positioned in the guide tube fails to fire within a predetermined time. This position is reached by rotation of the guide tube 101 within the gate tube 102, the opening in the gate tube being then directed away from the rocket magazine, so as to bring the openings thereof into registry and enable the jettisoning of the rocket loaded in the launching barrel.

Referring now to FIG. 4, the operating mechanism of the launching barrel will be described. The guide tube 101 is shown with its opening directed toward the magazine or feeding mechanism, its normal operating position. Gate tube 102 is shown with its opening partly in registery with that of the guide tube, and it is provided with an arcuate gear segment 104 extending over a portion of its circumference to facilitate rotation thereof about the launching tube 101. Numeral 105 designates a suitable rack and gear box which cooperates with the gear segment 104 to control the rotation of tube 102 about the guide tube 101. As described in detail in discussing the loading mechanism, it is apparent that the operation of the gate tube 102 about the launching tube 101 must be synchronized with the feeding mechanism and acceleration portion of the loading mechanism in order that the openings in tubes 101 and 102 may be in registry and directed toward the feeding mechanism in readiness to receive a rocket to be fired coincidentally with the feeding thereof by the accelerating portion of the loading mechanism; and in addition, the movement of the gate tube 102 must be further synchronized therewith so as to close the rocket receiving gateway in order to permit firing of the rocket, and then to return to the open position as the next rocket is being impelled into the guide tube 101. This synchronous relationship is attained through the cams 111 and 112 as described in detail above.

Considering next the jettisoning mechanism of the launcher, its jettisoning position is shown in FIG. 9, where the gateway is formed by appropriate rotation of the tubes 101 and 102 so as to open in a direction away from the feedeing mechanism, which position may be obtained when a dud rocket has failed to fire within a predetermined time in order that it may drop or be ejected from the barrel. The jettisoning operation is performed by rotation of the guide tube 101, after the gate tube 102 has been rotated to close the gateway with a rocket loaded in the launching tube, so as to bring the opening 101a of tube 101 into coincidence with the then existing position of the opening 102a in tube 102. Referring now particularly to FIG. 16, this rotation of the guide tube 101 is accomplished in a manner akin to the rotation of the gate tube 102. The guide tube 101 has at one end thereof an arcuate gear segment 150 over a portion of its circumference, similar to the gear segment 104 on the gate tube 102, operating in conjunction with the gear box 156. Thus rotation of the gear 155 causes the desired rotation of the guide tube 101. The operation of the gear box 156 is controlled by a hydraulic piston, this control means being generally indicated by the numeral 157, which is shown in detail in FIGS. 17 and 18 and which is to be more fully described below.

The extent of a reciprocatory stroke of the hydraulic piston and the consequent stroke of the rack 151 which is operated thereby is controlled by the limit switch 161 having a depending switch arm 162. As the piston reciprocates, it engages the switch arm 162 at one end of its reciprocatory stroke by means of the adjustable limit pin 163, thereby throwing the switch, which through means hereinafter described causes the piston to move in the opposite direction until the arm 162 is engaged by the other adjustable limit pin 164, thereby throwing the switch in the opposite direction and causing the opposite reciprocation. Reciprocation of the rack 151 causes rotation of the gear 152 meshed therewith, which is in turn united with gear 153 for corresponding rotation, gear 153 is meshed with gear 154 which is united with gear 155 for corresponding rotation, and gear 155 is meshed with the gear sector 150. Thus, through the gear box 156, reciprocation of the rack 151 causes a corresponding reciprocatory rotation of the guide tube 101. In normal operation, the jettisoning mechanism need not be employed. It is brought into operation only when a rocket which has been introduced into the guide tube has failed to fire within a predetermined time. If after closure of gate tube 102 and the lapse of the predetermined time the rocket loaded in the launcher has failed to fire, the feeding and loading mechanisms automatically cease operation; whereupon, the hydraulic piston may be operated to cause reciprocation of rack 151, and thus rotation of the guide tube 101 to bring the opening 101a therein into coincidence with the opening 102a in the gate tube 102, these openings being directed away from the feeding mechanism as shown in FIG. 9, enable the dud rocket to be jettisoned from the launcher either by gravity or by any other suitable means. When the opening of the guide tube 101 has been thus brought into coincidence with the opening of the gate tube 102, the piston has moved so as to bring the limit pin 164 into contact with the switch arm 162 and cause it to be thrown, thus initiating the return stroke of the piston to return the guide tube 101 to its initial position as shown in FIG. 8, with its opening directed toward the feeding mechanism in readiness to resume operation. The automatic cessation of the feeding and loading operations when a dud rocket has thus failed to fire, effectively eliminates the possibility of a jam up at the launcher from this source, and the provision of the jettisoning means provides for resumption of operation in the event that a dud rocket does enter the launching barrel.

The hydraulic piston mentioned hereinabove is shown in detail in FIGS. 17 and 18. When the piston 173 is in the position shown in FIG. 17, the limit switch 161 is in a position which results in high pressure fluid being fed through the line 160 against the pilot piston 168 to move it to the position shown in FIG. 18, and thereby enabling the fluid to pass through the passage 172 and into the chamber 171 to force the hydraulic piston and its associated rod 166 to the left as shown in FIG. 18. The exhaust fluid from the piston chamber 170 during this movement flows through the passage 169 and thence out through the exhaust pipe 159. When the piston 173 reaches the position shown in FIG. 18, the limit switch 161 is thrown in the opposite position removing the high pressure from inlet 160 and causing the high pressure fluid to be applied solely to the left end of pilot piston 168 as shown in FIGS. 17 and 18 through the inlet line 158 and through the passage 158a formed in the pilot piston to move it to the right to the position shown in FIG. 17, thus enabling the high pressure fluid to pass from inlet 158 through the passage 169 and into chamber 170 to force the piston 173 to the right to the position shown in FIG. 17. The exhaust from chamber 171 flows through the passage 172 and thence out through the exhaust pipe 159. A bleed valve 167 operates in conjunction with the control piston 168 to facilitate movement thereof in its seat which would otherwise be hindered by the entrapment of air or the formation of a vacuum between pilot piston ring 175 and the portion of the pilot piston casing designated by the numeral 176. As indicated above, one complete reciprocatory cycle of this piston results in rotating the guide tube 101 into its jettisoning position, as shown in FIG. 9, and then returning it to its normal operating position, as shown in FIG. 8, after the dud rocket has been jettisoned.

The accomplishment of the foregoing operations will be more fully understood after a consideration of the following sections entitled "Electrical Firing and Operational Control System" and "Hydraulic System."

As indicated earlier in the present specification, a fire and jettison control device is provided, the effects of which are to cause an automatic cessation of the feeding and loading operations if a rocket positioned within the launching tube has failed to fire within a predetermined time, to prevent the firing of a rocket during the jettisoning operation, and to enable the jettisoning operation to be carried out when a dud rocket is positioned in the launching tube. The present is a discussion of this mechanism directed primarily to its mechanical structure and operation, with only incidental references to its operation in conjunction with the firing and operational control circuits, that being reserved for detailed consideration in the section entitled "Electrical Firing and Operational Control System."

Referring now to FIGS. 10 and 11, a bumper 280 is positioned in the wall of the launching tube 101 opposite from the rocket loading opening 101a therein, couched between the two rocket bearing rings 603 designed to engage the rear peripheral surface of a rocket, and is shown as having three operative positions, the solid line intermediate position and the two dotted line positions 280a and 280b. The dotted line position 280a is occupied when no rocket is positioned within the launching tube 101, the solid line position is that occupied when a rocket is positioned within the launching tube, and the dotted line position 280b is that occupied upon the firing of a rocket as it passes out of the tube. When a rocket is positioned within the launching tube, the bumper 280 is forced into the solid line position by engagement thereof by the groove 80 about the rocket's circumference.

Bumper 280 is linked by means of the connecting pin 290 to the bell crank 281, rocking about its pivot pin 282. A rod 283 is connected to the rocking arm 281 by means of the bolt 291 and is substantially enclosed within a housing comprising the housing elements 295, 285, 284, and 284a and the adjustment nut 296. A spring 292 bears between the elements 284 and 284a, and a second spring 286 preferably of the flat washer construction indicated bears between the elements 284a and 295. Movement of the bumper from the position 280a toward the position 280b causes a movement of arm 281 to compress the springs 292 and 286, the housing elements 284 and 284a being separable and reciprocable within a portion of the element 285. The return movement of bumper 280 from the position 280b toward the position 280a is obtained when the launching tube is empty in response to the compressed springs 292 and 286. Spring 286 controls the movement of bell crank 281 between the solid line position of bumper 280 and its dotted line position 280a, while spring 292 controls the action between the solid line position and dotted line position 280b of bumper 280, the desired initial compression of spring 292 being obtained by the adjustment of nut 296 on the rod 283. In addition, arm 281 carries two contact lugs 287 and 287a, only the former of which is shown in the longitudinal sectional view of FIG. 10 engaging the contact plate 288, both lugs being shown in FIGS. 20, 21, and 22. The contact lug 287 is held in position by the bolt 297 against the compression of spring 289 contained within the insulated housing 298. The mechanical structure of lug 287a is substantially identical to that shown for lug 287.

Thus, with the launching tube 101 empty, the bumper 280 assumes the dotted line position 280a as forced there by the action of springs 292 and 286 upon the rocking arm 281. In this position the contact lug 287 is out of engagement with the contact plate 288. When a rocket is introduced into the launching tube 101, the bumper 280 is forced into the solid line position by engagement therewith of slot 80 on the rocket casing, resulting in a commensurate movement of rocking arm 281 against the spring 292, thereby causing the contact lug 287 to engage the contact plate 288. Upon firing of the rocket, as it moves past the bumper 280 the latter is forced into the dotted line position 280b, causing a commensurate movement of the rocking arm 281 against the spring 286. In this position, a greater pressure is exerted by the contact lug 287 upon the contact plate 288 causing a relative movement between the lug and the housing 298 against the spring 289.

The purpose of the present mechanism is to control the engagement between the contact lugs 287 and 287a and the contact plates 288, 288a, and 299, see FIGS. 20, 21, and 22, thus operating as a control switch in the firing and the jettisoning control circuits. These control operations will become apparent from a consideration of the detailed discussions of the electrical firing and operational control system, the present discussion being limited primarily to a consideration of the mechanical operation of this fire and jettison control mechanism. FIG. 21 shows the launcher in open position ready to receive a rocket yet still empty, therefore no pressure is exerted against the bumper 280 and the contact points 287 and 287a are held out of engagement with the plates 288 and 288a respectively; FIG. 20 shows the launcher in a loaded condition with a rocket pressing against the bumper 280 causing the contact lugs 287 and 287a to engage their respective plates 288 and 288a; and FIG. 22 shows the jettisoning position of the launching tube with the rocket already jettisoned therefrom, yet due to the rise 299a connecting the contact plates 288 and 299, the contact lugs are maintained in engagement therewith despite the empty condition of the launching tube and the fact that the bumper 280 has assumed the dotted line position 280a shown in FIG. 10. The contact lugs 287 and 287a, being united to the launching tube 101 through rocking arm 281, move in correspondence therewith to transverse the contact plate 288a, and plate portions 288, 299, and the rise 299a between portions 288 and 299, the two contact plates being fixed in position by attachment to the structural frame of the rocket launcher, or to any other convenient stationary portion thereof. The reason for the rise 299a for maintaining engagement between contact plate portion 299 and the contact lugs after jettisoning of the rocket will become apparent from the subsequent discussion of the electrical firing and operational control circuit.

As indicated in the previous discussions of the loading and jettisoning operations and of the launcher mechanism, the guide tube and gate tube are each independently rotatable. The following is a description of one means which may be employed for mounting the guide tube on the structural frame of the present rocket launcher and for mounting the gate tube on the guide tube to enable the desired rotational movements, and is made with particular reference to FIGS. 10 and 13. Of these two mountings, considering first that of the guide tube 101 reference will be had primarily to FIGS. 10 and 13, FIG. 13 being a cross-sectional view of the launching barrel taken along the line 13—13 of FIG. 10 and showing a cross-sectional view of the rear mounting of the guide tube. The rear guide tube mounting comprises a bearing annulus 200, attached to the guide tube for rotation therewith, and the mounting sleeve 201, fixed to the structural frame of the present rocket launcher and carrying therein the guide tube and its bearing annulus. As shown particularly in FIG. 10, the bearing annulus 200 is bolted or otherwise securely affixed to the guide tube 101 and has extending therefrom an eccentric bearing plate portion indicated by the numeral 215. As can be seen by reference to FIG. 13, the bearing plate portion 215 is free to rotate within the mounting sleeve 201 whose internal diameter is slightly larger than the external diameter of the eccentric bearing plate 215. In addition, the mounting sleeve 201 is provided at its forward end with the inwardly projecting shoulder 214 throughout its circumference for engaging the leading edge of the bearing plate portion of the annulus 200, while the leading edge of the annulus 200 is provided with the projecting flange or key 600 over a portion of its outer circumference engaging the groove or keyway 601 formed over a portion of the inner circumference of the mounting sleeve 201, thereby preventing longitudinal slippage of the guide tube through the mounting and guiding the rotational movement of the tube therein.

As indicated above, the mounting sleeve 201 is fixed in position and supported by the structural frame of the rocket launcher. As shown in FIG. 13, this is accomplished through three of the transverse structural frame supports 30 and two vertical supporting beams 202 and 202a, which are preferably as shown in the drawings U-shaped channel beams. The bottom support for the mounting sleeve 201 comprises two of the transverse frame structural beams 30 connected by the bridge member 700, which is so formed as to conform to the exterior contour of the bottom portion of the mounting sleeve 201. The beams 202 and 202a are supported between the top and bottom structural beams 30, shown in FIG. 13. These beams are each formed along one side to conform to the exterior contour of the side portions of the mounting sleeve 201 and thereby each provide a side support therefor. Thus, there is afforded substantially a three point suspension for the cylindrical mounting sleeve.

With the structural support thus formed by the beams 30 and the vertical struts or beams 202 and 202a, the annular mounting sleeve 201 is welded or otherwise fixed in position thereto. The guide tube 101 is then inserted through the mounting sleeve 201, the bearing annulus 200 is slipped over the tube and positioned thereon with its forward edge in engagement with the shoulder 214 of the sleeve 201, the bearing annulus is bolted or otherwise affixed to the tube, and the tube and annulus are then rotated to bring key 600 into its keyway 601. Having thus described the rear mounting of the launching tube, it is sufficient to mention that as indicated in FIG. 2 an identical mounting structure is provided at the forward end of the guide tube, but having the shoulder 214 of the mounting sleeve 201 cooperating with the rear edge of the bearing annulus 200; these two mounting structures thus cooperate with each other to prevent longitudinal slippage of the guide tube in either direction, yet permit rotation thereof.

As previously indicated, the gate tube 102 is carried by the guide tube 101 and is mounted for rotational movement thereon. In describing this carriage, reference will be had particularly to the longitudinal section of the rear end of the launching barrel shown in FIG. 10. A plurality of brackets 219 are secured to the guide tube 101, each carrying a roller contact wheel 220, while the gate tube 102 is provided with the grooved trackway 221 for the roller contacts 220 secured to the end of the main body thereof by riveting, welding, or the like. Thus, the gate tube 102 may be slid into position over the guide tube 101 and the brackets 219 bolted into position upon the guide tube 101 to bring the roller contact wheels into engagement with the groove 221. The forward end of the gate tube is similarly constructed and cooperates with a similar group of brackets and roller contact wheels, thereby providing for rotation of the gate tube about the guide tube as required by the above-described loading operation. Thus, the above-described mounting for the guide tube and the mounting of the gate tube over the guide tube provide for independent relative rotation between said two tubes for accomplishing the desired operational functions of the rocket launcher. As is apparent, the gate tube is mounted on the guide tube before the latter is positioned on its mounting structures as described above, when the specific mounting structure here described is employed. A buffer mechanism 203 is associated with each of the two launching tube supporting structures described above, one of which is shown in its operative position in FIGS. 10 and 13, and is shown separately in detail in FIGS. 14 and 15. Referring to these drawings, the buffer mechanism includes a casing 217 within which is contained a hydraulic system enclosed between the two pistons 262 and 254, the piston 262 operating against the coil spring 263 and the piston 254 engaging the bearing surfaces 215 of the bearing annulus 200 through its roller contact wheel 216. The buffer mechanism is seated in position by means of the two extending plates 251, formed as an integral part of the casing 217, which are clamped to the vertical strut 202a by bolts 252, or the like. The roller contact wheel 216 and the wheel carrying extending arm 253 of the piston 254 pass through suitable opening in the strut 202a and the mounting sleeve 201 to enable the roller contact 216 to engage the bearing surface 215 of the bearing annulus 200, forcing the launching tube and its associated annulus 200 into bearing engagement with the opposite portion of the sleeve 201. The extension 253 of the piston 254 is reciprocably mounted in the bushing 254a threaded into the casing 217, and is there held against rotation by the pin 256 extending across the bushing 254a and passing through the elongated slot 255 in the extension arm, while the piston 254 is contained within the seat 258. At the other end of the hydraulic system another piston 262 is positioned in the seat 261 and operates in conjunction with the helical spring 263 positioned in the chamber 264. The chamber 261a delineated by the piston 262 is connected through passage 259 to the chamber 258a delineated by the piston 254. Thus, when pressure is exerted upon the roller contact 216 so as to exceed the force exerted by the spring 263, the piston 254 moves inwardly within its seat causing the fluid in chamber 258a to pass through passageway 259 and into the chamber 261a to force the piston 262 upwardly into the chamber 264 against the compression of the helical spring 263. Upon release of the pressure applied to the wheel 216, the fluid thus contained in the chamber 261a against the pressure of the spring 263 may return through the passageway 259 into the chamber 258a to force the piston 254 into its starting position as shown in FIG. 14. However, the passageway 259 is provided with an adjustable cock 260, shown in detail in FIG. 15, which acts as a flow check for the fluid passing through the passageway 259. Thus, if the cock 260 is so positioned as to substantially constrict the passage 259, the hydraulic buffer mechanism responds slowly to pressure applied to the contact wheel 216 to cushion more effectively large shocks received by the piston arm 253, and the return of fluid through the passageway 259 into the chamber 258a would be correspondingly sluggish and cause a slow return of the piston 254 to starting position, thereby increasing the time interval before the mechanism is in readiness to receive a subsequent shock; therefore, a return passage 267 is provided from the chamber 261a to the chamber 258a passing through the one way ball valve 268, spring pressed in its seat by means of the spring 269, this return line being completed through the passageway 270 into the chamber 258a. Thus, when the cock 260 is turned for slow action of the buffer mechanism and shock pressure is applied to the contact wheel 216, the piston 254 yields thereto and operates against the piston 262 and its spring 263; but upon release of the pressure applied to arm 253, the return of the buffer mechanism to starting position is substantially instantaneous as effected by the ready return of fluid through the return line. A buffer mechanism identical to that here described is correspondingly positioned upon the supporting structure carrying the forward end of the guide tube, as indicated in FIG. 2.

Thus, with the present buffer mechanisms in place upon the supporting structures of the guide tube and with their contact wheels 216 in engagement with the bearing surfaces of the annuluses 200, shocks imparted to the guide tube by the introduction of rockets thereto from the feeding mechanism, as accomplished by the aforedescribed accelerated movement of the last star wheels, are substantially absorbed by the buffer mechanism, thereby protecting the supporting structure of the rocket launcher from the strains which would otherwise result therefrom; for as a rocket is introduced into the launching tube, the shock imparted thereto causes the tube and its bearing annuluses to move against the contact wheels 216 and the piston arm 253, resulting in a substantial absorption of the shock by the two buffer mechanisms as above-described. Variations in the adjustment of the cocks 260 enable effective buffering of various shock loads.

In the launching of rockets a relatively large blast of hot and usually noxious gases is produced. It is desirable, therefore, that such an exhaust blast be directed away from the operators of the launching mechanism and be deflected from the structure upon which the rocket launcher is mounted. To this end the present rocket launcher is supplied with a blast deflector 204, which may be so turned as to funnel the exhaust gases in a direction away from the operator and the structure upon which the rocket launcher is mounted.

For the previously described operations of the present rocket launcher, the guide tube 101 is rotatably mounted upon the structural frame of the present device. Since the exhaust end of the guide tube must be connected to the blast deflector for the same to be effective, and since it is preferable that the blast deflector be stationary to minimize the load on the guide tube rotational power source and strains on the supporting structure, special provision must be made for effecting a coupling therebetween. One embodiment of a suitable coupling is shown in FIG. 10, wherein two intermediate coupling elements 207 and 210 are provided to form a rotational and substantially gas tight union between the blast deflector 204 and the exhaust end of the launching tube 101. The coupling element 210 is an annular member circumscribing the exhaust end of the guide tube 101 and is securely affixed thereto by means of bolts, rivets, or the like through the portion 212 thereof, while the portion 211 forms an extending flange about the exhaust end of the guide tube 101. The exhaust deflector 204 is united by its flange 205 to the flange 206 of the coupling element 207, while this coupling element is formed with the second flange portion 223 engaging the flange portion 211 of the coupling element 210. A third flange portion 224 is formed on the coupling element 207 which is securely united to the structural frame of the rocket launcher through the union plates 602, thus fixing the blast deflector 204 in position with respect to the structural frame. In order to make a substantially gas tight seal between the coupling elements 207 and 210, the flange portion 211 of element 210 is provided with two extending annular ridges 209 which fit into two corresponding annular grooves 208 formed in the flange portion 223 of the coupling element 207. In addition, the stepped portion 222 of the coupling element 207 joining the two flange portions 224 and 223 forms a cup like shield about the union being effected and further aids in baffling the exhaust gases that may escape therethrough. Thus, a substantially gas tight seal is provided between the coupling elements 207 and 210, and at the same time enabling the desired rotation of the guide tube with respect to the blast deflector.

In order to further insure against the deleterious escape of noxious blast gases from the launching barrel 100, an effective seal between the guide tube and gate tube must be provided in the closed gateway, or firing condition thereof. To this end the engaging edges of the gate tube and guide tube are beveled to form a tight contact surface along the ends of the gateway formed by the openings therein, as shown in FIG. 10. In addition, the eccentric positioning of the gate tube with respect to the axial center of the guide tube and the beveling off of the outside of longitudinal edges of the opening in the guide tube to conform to the radius of curvature of the internal circumference of the gate tube, as is clearly depicted in FIGS. 7, 8, 9, and 10, provide for tight engagement between the two tubes along the upper and lower longitudinal edges of the opening in the guide tube when the tubes are in the firing position shown in FIG. 8. Because of this eccentric positioning of the gate tube with respect to the guide tube, excessive friction would be obtained between the two tubes when the guide tube rotates to jettison position (FIG. 9) from the firing position (FIG. 8) were eccentric rotation not provided for the guide tube with respect to its axial center in this movement. To this end, the bearing plate portions 215 of the bearing annuluses 200 are eccentrically arranged with respect to the axial center of the guide tube, thereby providing the desired eccentric rotation thereof. To conform thereto, the grooves 208 in blast deflector coupling element 207 and the ridges 209 in the coupling element 210 are correspondingly eccentrically arranged to permit the desired eccentric rotation of the guide tube. Thus, the launching mechanism of the present invention is so designed and constructed to substantially prevent the deleterious escape of hot and noxious exhaust blast gases resulting from the firing of a rocket, except as directed by the blast deflector attached to the exhaust end of the guide tube.

*The electrical firing and operational control system*

The present rocket launcher, whose mechanical structure and operation have been described above, has several phases of operation including the loading of the magazine, the automatic feeding and loading of rockets into the guide tube and firing therefrom, the jettisoning of dud rockets from the launching barrel, and the manually controlled single feed and fire of rockets, which are all under the control of the electrical firing and operatoinal control system illustrated in FIG. 20. This system comprises a plurality of electrical circuits functioning in conjunction with a plurality of switches, a clutch and brake control solenoid 315, a pair of jettison cylinder control solenoids 322 and 323, a relay 306 operating on the single pole double throw switch 308, the contact lugs 287 and 287a cooperating with the contact plate 288a and the contact plate comprising the portions 288, 299a, and 299, and the rocket firing contacts 361 and 362. Considering in general, first, the automatic feed and fire aspect, to place the circuit in readiness therefor, the master switch 302 of the electrical firing and operational control system is closed, the feed control switch 303 is closed, the fire control switch 304 is placed in "fire" position, and the magazine loading switch 317 is placed in 'fire" position. With the circuit in the foregoing condition, to operate the rocket launcher the firing key 305 is closed, and so long as it remains closed rockets are automatically fed to and fired from the launching barrel at a predetermined rate as established by the setting of the variable speed hydraulic motor 425 (FIGS. 2 and 19), forming the power drive source therefor. However, if during this operation a dud rocket enters the guide tube and fails to fire within a predetermined time, the operation of the feeding and loading mechanisms is automatically stopped and remain inactive until the dud rocket is jettisoned from the barrel. In order to accomplish the jettisoning operation, the jettison switch 331 is closed and there held until the operation has been completed, whereupon the reinitiation of the automatic feed and fire circuit, by closure of firing key 305, causes a resumption of the automatic feeding and firing of rockets.

Considering the automatic feed and fire circuit in detail, with the switches of the present electrical control circuit in the condition indicated above, and with the firing key 305 closed, current flows from the current source 301 through lead 333, master switch 302, leads 336 and 332, firing key 305, leads 339 and 338, feed control switch 303, leads 340 and 345, switch 308, said switch being normally biased to engage contact point 324, lead 348, switch 316, clutch and brake control solenoid 315, and thence to ground. As will be described in detail in the section entitled "Hydraulic System," the solenoid 315 operates the valve 436 in the hydraulic system, shown in FIG. 19, to simultaneously control a brake and a clutch associated with the hydraulic motor 425 forming the power drive source of the present rocket launcher. The present circuit functions to energize the clutch and brake solenoid 315, causing the clutch to be engaged and the brake to be released, thereby enabling the hydraulic motor to transmit the operating power to the feeding and loading mechanisms. With the initiation of the present circuit by closure of the firing key 305, the feeding mechanism automatically delivers rockets to the guide tube at a predetermined rate, as they are automatically fired therefrom. In addition to the above-described automatic feeding and loading circuit, current also flows from the current source 301 through master switch 302, firing key 305, and lead 339, as for the preceding described circuit, but then the current flows through a circuit in parallel to the remainder of the above-described circuit including fire control switch 304, lead 342, switch 318, lead 355, switch 317, lead 354, contact plate 288a, contact lug 287a, lead 360, firing contacts 361 and 362, these contacts engaging the rocket then positioned in the launching barrel in parallel, and thence to ground, thereby completing the firing circuit through the rocket to ground and causing it to be fired. It is to be noted in connection with this latter circuit, that switch 318 is not always closed but is biased to open condition by a spring or the like, not shown, and is controlled by the gate tube 102 which has the ear 321 projecting therefrom and operating to engage the roller contact 320 carried by rod 319, which in turn is connected at its other end to the switch 318. The switch 318, is thus closed by engagement of the ear 321 with the contact roller 320. It is apparent from reference to FIG. 20 that the ear 321 is so positioned on the gate tube 102 that it operates to close the switch 318 only when the gate tube is in firing position, thereby insuring closure of the loading gateway before a rocket can be fired and preventing the accidental firing of the rocket before complete closure thereof.

Upon interruption of the present automatic feed and fire circuit by release of the firing key 305, by the provision of a zeroing means the loading of the guide tube nevertheless continues until a rocket is loaded therein and the gateway closed in readiness for fire, which is herein termed the zero position of the launching barrel and is the position illustrated in FIG. 20. To this end, the zeroing cam 310 is provided with an extending portion 311 on its surface, and its rotation is keyed to the cyclic operation of the present device, such as for example by being keyed to shaft 51, thereby operating the switch 309 through the rod 367 to close said switch to the contact point 327 during a portion of the operational cycle, and permitting switch 309 to return to its normally biased position, in engagement with contact point 326, during the remainder thereof. If during automatic feed and fire operation of the rocket launcher the firing key 305 is released, the feeding and loading of the launcher would cease but for the zeroing means, for if the barrel is not in zero position as shown in FIG. 20, the contact roller 366 engages the smaller diameter portion of the cam 310 enabling the switch 309 to engage the contact point 326, thereby permitting current to flow from the current source 301 through lead 333, master switch 302, lead 334, feed control switch 303, lead 335, switch 309, then in contact with the contact point 326, a portion of lead 340, lead 345, switch 308, in contact with the contact point 324, lead 348, switch 316, clutch and brake operating solenoid 315, and thence to ground, thus energizing the solenoid 315 and causing the feeding and loading operations to continue so long as the contact roller 366 engages the smaller diameter portion of the cam 310. As the rocket launching barrel reaches its zero position with a rocket loaded in the guide tube and the loading gateway closed in readiness for fire, the cam 310 is correspondingly rotated to bring its extending portion 311 into engagement with the contact roller 366, whereupon the switch 309 is caused to break from contact point 326 and to engage the contact point 327, thereby breaking the circuit to the clutch and brake solenoid 315 and causing the feeding and loading operations to cease.

The present fire and operational control circuit also provides for a single feed and fire of rockets in addition to the above-described automatic operation; in other words, single rockets may be fired one by one as desired, rather than having them automatically fired at a predetermined rate as controlled by the speed setting of the motor 425. To this end, the present circuit is controlled by proper positioning of the feed control and fire control switches 303 and 304. Considering first the situation where a rocket is already loaded in the launcher and in readiness for fire, if the master switch 302 is closed, the fire control switch 304 put in fire position, but the feed control switch 303 opened, upon closure of firing key 305 the rocket then in the launching barrel is fired by means of the firing circuit described above under the discussion of automatic feed and fire. With the rocket fired, however, and the circuit in the above-mentioned condition, the launching barrel is not reloaded because there is no means for initiating the clutch and brake control solenoid 315. If the fire control switch 304 is then thrown to "safe" position and the feed control switch 303 is closed, closure of the firing key 305 cannot operate to initiate the firing circuit because that has been opened by switch 304 being placed in "safe" position, however current does flow from the source 301 through lead 333, master switch 302, leads 336 and 332, key 305, lead 339, switch 303, a portion of lead 340, lead 345, switch 308, which is then in contact with the contact point 324, lead 348, switch 316, clutch and brake control solenoid 315, and thence to ground. Thus, with the circuit in this condition, closure of the firing key 305 initiates the clutch and brake solenoid to drive the feeding and loading mechanisms of the rocket launcher but does not initiate the firing circuit. For the purpose of reloading the launching barrel, closure of the firing key 305 need be only momentary, for initiation of the feeding and loading mechanisms through the above-described circuit causes a rotation of cam 310, and as soon as the extending portion 311 thereof becomes disengaged from the roller contact 366, the switch 309 engages the contact point 326, thereby enabling continued operation of the feeding and loading mechanisms for the remainder of the loading cycle, or until the portion 311 of cam 310 re-engages the roller contact 366, through the automatic zeroing circuit described in considering the automatic feed and fire aspect. At this time the barrel is again in zero position and a rocket is loaded in the guide tube in readiness for fire. However, if the firing key 305 is kept depressed for longer than is necessary to complete the loading cycle, the feeding and loading operation does nevertheless automatically cease shortly after the launcher has attained its zero condition, as will become apparent from the subsequent discussion. In this manner, therefore, another rocket is loaded into the launching barrel, and the clutch and brake solenoid is deenergized, thereby ceasing the feeding and loading operations. To fire this second rocket the feed control switch 303 is opened, the fire control switch 304 is placed in "fire" position, and the firing key 305 is closed to fire the rocket then in the barrel. This operation may be repeated as many times as desired, thereby effectuating a single feed and fire of rockets rather than the automatic feed and fire previously described. Although the preceding discussion assumes that the barrel is in zero position at the outset, it is apparent that if the barrel is not loaded at the outset, the single feed and fire operation may nevertheless be carried out by first initiating the above-described single rocket feeding and loading circuit and then firing the rocket thereby loaded.

As occasionally occurs, a dud rocket may be loaded into the guide tube and fail to fire within the firing portion of the operational cycle. Upon the happening thereof, the present rocket launcher is provided with means whereby the feeding and loading operations are automatically ceased, as mentioned in the preceding section, and in addition means are provided for jettisoning such a dud rocket from the barrel in order that operation thereof may be resumed. To this end the present firing and operational control circuit is provided with the manually controlled jettison switch 331, the jettison control solenoids 322 and 323, and the misfire cam 312. The jettison control solenoids 322 and 323 control the operation of the jettison cylinder 157, shown in FIGS. 16, 17 and 18 and described in detail in the preceding section. The misfire cam 312 has an extending portion 313 and like zeroing cam 310 is keyed to the cyclic operation of the rocket launcher, as by being keyed to shaft 51, and cooperates with the roller contact 361 to operate switch 314 through the arm 362, the switch 314 being normally biased to be disengaged from the contact point 328.

If during the use of the rocket launcher zero launching barrel condition has been attained, either during automatic or single feed and fire, and the firing key 305 is maintained closed, continued operation of the feeding mechanism causes cam 310 to rotate past the zero position shown in FIG. 20, thereby enabling the switch 309 to engage the contact point 326, and similarly, the misfire cam 312 continues to rotate past its zero position until its extending portion 313 engages the roller contact 361 to bring the switch 314 into engagement with the contact point 328. If at this point in the operational cycle the rocket positioned in the launcher has failed to fire, the relay 306 is energized causing the switch 308 to break with the contact point 324 to which it is normally biased and to engage the contact point 325, thereby illuminating the dud rocket indicator lamp 307 and breaking the energizing circuit of the clutch and brake solenoid 315, causing the operation of the feeding and loading mechanisms and the rotation of the cams 310 and 312 to cease, thus maintaining the switch 309 in engagement with the contact 326 and the switch 314 in engagement with the contact 328. The dud rocket indicator lamp 307 is illuminated by the circuit including the current source 301, lead 333, master switch 302, leads 336 and 332, firing key 305, leads 339 and 338, feed control switch 303, leads 340 and 345, switch 308, then in engagement with the contact point 325, lead 346, lamp 307, and thence to ground. The relay 306 is energized by the circuit including the source of current 301, lead 333, master switch 302, lead 334, feed control switch 303, lead 335, switch 309, then in engagement with the contact point 326, lead 364, switch 314, then in engagement with the contact point 328, leads 365 and 344, relay 306, leads 347 and 351, contact plate portions 299, 299a, and 288, contact lug 287, and thence to ground. Thus, if a dud rocket is loaded in the guide tube and fails to fire within a predetermined time, a jam up at the launching barrel is prevented by the automatic cessation of the feeding and loading mechanisms, and the same is indicated to the operator by the dud rocket indicator lamp 307. Due to the pivotability of bell crank 281, as discussed above, the initiation of relay 306 can occur only when a rocket is positioned within the launcher, for it is only when bumper 280 is either in the solid line position or the dotted line position 280b shown in FIG. 10 that the contact lug 287 engages the contact plate 288, enabling the above-described circuit through the relay to be complete. If at the present considered point in the operational cycle of the rocket launcher the last fed rocket has already been fired, the normal bias of rocking arm 281 causes the contact lug 287 to be disengaged from the contact arm 288, thus preventing energization of the relay 306 and permitting the continued operation of the feeding and loading mechanism despite the engagement of switch 314 with the contact point 328.

To free the launcher of the dud rocket the operator closes the manual controlled jettison switch 331, thus enabling current to flow from the current source 301 through the jettison control circuit comprising the lead 333, master switch 302, lead 336, jettison switch 331, lead 353, switch 161, contact point 330, jettison control solenoid 323, leads 352 and 351, jettison control circuit contact plate portions 299, 299a, and 288, and contact lug 287 connected to ground. Energization of the jettison control solenoid 323 controls the hydraulic feed to the jettison control cylnider 157, as shown in FIG. 19 and discussed in the succeeding section entitled "Hydraulic System," thereby causing movement of the rack 151 which in turn rotates the gears 152 and 155 to rotate the guide tube 101 by means of its arcuate gear segment 150 to bring its opening into coincidence with the then existing portion of the opening of the gate tube 102, thus permitting jettisoning of the rocket from the launcher, which may be accomplished by gravity or any other suitable means. When the openings in the two tubes have reached coincidence, the switch 161 is caused by the action of adjustable limit stops 163 and 164, shown in FIG. 16, on switch arm 162 to break from contact 330 and to engage the other solenoid contact 329, thereby deenergizing solenoid 323 and energizing the jettison control solenoid 322 to reverse the action of the hydraulic jettison cylinder, as will be discussed in detail in the succeeding section in conjunction with FIG. 19. This action causes the rack 151 to reverse its direction of movement and causes the guide tube 101, through the gears 152 and 155 and the gear segment 150, to rotate back to its original zero position.

During the rotation of tube 101, the contact lugs 287 and 287a are caused to traverse the entire jettison control mechanism contact plate comprising portions 288, 299, and 299a, affording throughout this travel the ground connection required for the feeding of current to the jettison control solenoids from the source 301. It is to be noted that after jettisoning of the rocket the bumper 280 would assume the dotted line position 280a as shown in FIG. 10, and as described above, ordinarily in an empty launcher condition the bumper 280 in position 280a causes the breaking of contact between the contact lugs 287 and 287a with the contact plate 288a and plate portion 288. However, due to the uprising portion 299a between contact plate portions 288 and 299, after jettisoning, while the bumper 280 assumes its position 280a, contact is nevertheless maintained between the lugs and the plate portion 299 because of the relative spatial displacement between portions 288 and 299, thus enabling the continued flow of current from the source 301 through the lug 287 to ground and permitting the continued energization of the jettison control solenoid 322. After the rocket has been jettisoned, the tube 101 returned to zero position, and the contact lug 287 located over plate portion 288, as shown in FIG. 20, the empty condition of the launcher permits the bumper 280 to be in the position 280a and lug 287 is disengaged from the contact plate 288. This results in an extinguishment of the lamp 307, as caused by the deenergization of the relay 306, and in a cessation of the jettisoning operation by deenergization of the jettison solenoids.

Upon completion of this return stroke of the jettison cycle, the switch arm 162 is again thrown to bring switch 161 into engagement with contact point 330, placing the circuit in readiness for the next jettison cycle. The herein described effects of a dud rocket upon the feeding and loading mechanism and the operation of the present firing and operational control system upon the launcher to jettison such a rocket is applicable whether the single or automatic feed and fire aspect is being employed. After jettisoning of the dud rocket has been completed and the tube 101 has been returned to its zero position, the operation of the launcher may then be continued in the manner described above. Although the jettisoning operation is herein described and shown as a manually controlled operation through the switch 331, it is apparent that it may be automatically controlled by providing a time delay circuit energized by the entry of a rocket in the launching barrel, to close automatically the jettison control switch 331, if the time delay circuit is continued in energized state over the desired portion of the operational cycle of the present rocket launcher by a rocket failing to fire in that lapse of time.

As mentioned above in the discussion of the single feed and fire operation of the present circuit, if during the loading operation, i.e. while the feed control switch 303 is closed and the fire control switch 304 is in safe position, the firing key 305 is maintained in closed position for longer than is required to complete the feeding and loading cycle, upon completion thereof or upon the barrel reaching its zero position with a rocket loaded therein, the feeding and loading mechanism is automatically caused to cease operation. This automatic cessation is accomplished through the cooperation of the zeroing cam 310 and the misfire cam 312 in the manner similar to that as is caused when a dud rocket is fed to the launcher and before jettisoning thereof. For if the firing key 305 is maintained closed after the launcher has reached its zero position, the cam 310 rotates to bring its smaller diameter surface into engagement with the roller contact 366, thereby enabling the switch 309 to engage the contact point 326, while cam 312 rotates until its extending portion 313 engages the roller contact 361, thereby causing switch 314 to engage the contact point 328. Thus, as in the manner afore-described, relay 306 is energized causing switch 308 to break from contact 324 and to engage the contact point 325, resulting in the deenergization of the clutch and brake solenoid 315 to cause the feeding and loading operations to cease until such time as the rocket then in the launcher is fired or otherwise removed therefrom.

Thus, the electrically and mechanically interlock systems of the present device permit of automatic feed and fire of rockets at a predetermined rate, and also provide for single feed and fire, one by one, as manually controlled by the operator. And further, in the case of a dud rocket being fed to the guide tube, whether automatic or single feed and fire is being employed, the present rocket launcher is provided with means for automatically causing a cessation of the feeding and loading operations until the rocket is jettisoned therefrom, thereby eliminating the possibility of a jam up due to failure of a rocket to fire or due to failure of the launching mechanism itself.

An additional feature of the jettisoning operation provided by the present electrical system is the insurance against accidental firing of a rocket being jettisoned from the barrel. As discussed above, to complete the firing circuit to the rocket, engagement must be had between contact lug 287a and contact plate 288a, but as the guide tube 101 rotates into jettison position, engagement therebetween is broken as the contact lugs are caused to traverse the contact plates, and the firing circuit is thus maintained open during the entire jettison cycle preventing the firing of the rocket during that time.

In order to enable convenient loading of rockets into the magazine or feeding rack of the present rocket launcher, the present circuit is provided with a loading switch 317, preferably located in the vicinity of the loading end of the magazine. To load the magazine the switch 317 is alternately brought into and out of engagement with the contact point 370. Each time switch 317 is brought into engagement with this contact point, current flows from the current source 301 through lead 333, master switch 302, lead 334, feed control switch 303, leads 335 and 356, switch 317, clutch and brake solenoid 315, and thence to ground, thereby causing operation of the feeding mechanism by energization of solenoid 315. Thus, as rockets are positioned within the magazine through the feeding end thereof, the feeding mechanism may be advanced under control of the person feeding the rockets to said magazine. During this magazine loading operation the switch 317 is never brought into engagement with the contacts 371a and 371b, thereby insuring that the launcher does not fire a rocket during this magazine loading process. After the magazine has been loaded, with the fire control switch 304 in "safe" position switch 317 is thrown into permanent engagement with the contact points 371a and 371b, thereby placing the clutch and brake control solenoid 315 under the control of the above-described firing and operational control circuit.

Another feature of the present control system resides in the provision of the loaded launcher indicator lamp 382. This lamp is illuminated so long as a rocket is loaded in the guide tube and master switch 302 is closed and becomes extinguished when the launcher is emptied. It is illuminated through the circuit including the current source 301, lead 333, master switch 302, leads 336 and 350, lamp 332, lead 349, a portion of lead 347, lead 351, contact plate portions 299, 299a, and 288, contact lug 287, and thence to ground. So long as a rocket is positioned in the guide tube, lug 287 is maintained in engagement with the contact plate, as described above, to complete this circuit, while upon emptying of the launcher this contact is broken and the lamp is extinguished. During the jettisoning operation, however, as is apparent from the discussion thereof, the lamp 332 remains illuminated until completion of the entire operational cycle even after the dud rocket is discharged because of engagement between lug 287 and plate portion 299, raised with respect to portion 288.

*Hydraulic system*

The hydraulic system of the present rocket launcher is diagrammatically illustrated in FIG. 19, and is used to operate the brake cylinder 441, the clutch cylinder 416, the motor 425, and the jettison control mechanism 157. It includes the reservoir tank 400, which is connected through conduit 401 to a filter 402, and then through pipe 403 to a variable delivery pump 404. The pump 404 transmits the hydraulic fluid, such as oil or the like, through the conduits 405 and 409 to the two-way cock 410 forming a low pressure accumulator by-pass, from which stems a low pressure branch of the hydraulic system. This low pressure branch starts with conduit 412 and includes the variable pressure control valve 411, the pressure gage 414, the low pressure accumulator 415, and the conduit 413, which operates on one side of the clutch cylinder 416. The conduit 418 leads from the cock 410 to the high pressure accumulator by-pass 419, from which stems a high pressure branch of the hydraulic system operating the jettison, brake, and clutch cylinder and a motor operating branch operating the hydraulic motor 425. The conduit 420 leads from the by-pass 419 to the motor by-pass valve 421 from which stems the motor operating system, and the fluid is conducted from there through the conduits 423 and 424 to the hydraulic motor 425 which operates the main drive shafts 467 and 468, as mentioned above in connection with the feeding, loading, and launching mechanisms with reference to FIG. 2. This motor may be, for example, a Vickers Aircraft piston type constant displacement hydraulic motor. The hydraulic fluid is returned to the reservoir from the motor by means of conduits 426, 427, 429, and 408. If desired the motor may be by-passed by means of the valve 421 and the conduit 428 leading to the reservoir return line 429. Also included in the motor operating system is the motor direction control valve 422 which is connected across the feed and exhaust conduits of the motor in order to reverse the direction of the motor if desired.

The conduit 430 connects the by-pass 419 to the high pressure branch through the pressure regulator valve 432, connected to the reservoir return line 429 by relief by-pass 431, regulating the pressure to be fed into the high pressure system to preferably between 800 and 1100 pounds per square inch. The high pressure fluid thus fed from the regulator valve 432 is conducted by conduit 433 to the variable control valve 434 and then is conducted by the conduit 435 to the jettison cylinder operating system and to the control valve for the clutch and brake cylinder. Also connected on conduit 435 are a pressure gage 436 and high pressure accumulator 437.

When the clutch and brake solenoid 315 is energized, as described in the section entitled "Electrical Firing and Operational Control System," the two-way solenoid operated control valve 456, having the solenoid operated plunger 457, connects the high pressure conduit 435 to the conduit 438 and thence through conduit 439 to the clutch cylinder 416 and through the conduit to the brake cylinder 441, thereby driving the piston 417 of the clutch cylinder 416 against the low pressure from the conduit 413, causing a drive shaft clutch (not shown) to engage the motor 425, while the pressure from conduits 435, 438 and 440 operates to drive piston 442 of the brake cylinder 441 against the spring 451a, causing the drive shaft brake (not shown) to be disengaged therefrom, thus permitting operation of the feeding and loading mechanism of the rocket launcher. On the other hand, if the clutch and brake solenoid 315 is not energized, then the solenoid operated plunger 457 of the valve 456 is forced to its normally biased position shown in FIG. 19, cutting off the pressure feed from the high pressure line 435 and connecting the clutch and brake cylinders to the fluid return line 443 connected to conduits 429 and 408 leading to the reservoir 400, thereby enabling the low pressure feed from line 413 to drive the clutch cylinder piston 417 in the opposite direction to disengage the drive shaft from the motor 425, and simultaneously permitting the spring 451a of the brake cylinder 441 to drive the piston 442 of said cylinder into its normally biased position, thereby applying the drive shaft brake thereto, thus causing the feeding and loading operations to cease.

In the event that the jettisoning circuit is initiated the operational control of which is discussed under the section "Electrical Firing and Operational Control System," the valves 446 and 447 comprising the dual solenoid operated interrupter valve 454 are controlled by their respective solenoids 323 and 322 to drive the piston 173 in one direction or the other, depending upon the operation of the device, to cause the rocket to be jettisoned from the launcher as described above. When the jettisoning control solenoids 322 and 323 are not energized, the valves 446 and 447 are normally biased in closed position as shown in FIG. 19, thereby maintaining the cylinder in the position shown in FIGS. 17 and 19 by applying the high hydraulic pressure through conduit 158 to the left end of pilot piston 168 in the view shown in these figures, the normal or starting position. However, if the jettisoning circuit is energized, first the solenoid 323 is energized, as controlled by switch 161, to open the valve 446, thereby permitting the high pressure fluid from the pipe 444 to flow through the valve box 448 and through the conduits 450 and 160 to be applied to the right end of pilot cylinder 168, causing it through the greater surface area at this end of the piston than at the other, to move to the left into the position shown in FIG. 18. Thus the high pressure fluid is transmitted through conduit 172 to the jettison cylinder 157, causing the plunger 173 to move to the left, as illustrated in FIG. 19, into the position shown in FIG. 18. The exhaust fluid from cylinder 157 flows through conduit 169 to conduit 159 where it is fed to the reservoir return line 429 through conduits 451 and 443. On the completion of this phase of the jettisoning operation, the solenoid 323 is deenergized and the solenoid 322 is energized by operation of switch 161, thereby opening valve 447 and closing valve 446. This permits the high pressure which is always applied to the left end of the pilot plunger 168 (FIG. 19) to force it to the right, with the right end of the pilot plunger being open to the exhaust line through conduits 160 and 450, valve box 448, and conduits 449 and 451 to return line 443, causing the pilot plunger to move to the right and enabling the high pressure to be applied to the opposite face of the plunger 173 through pipe 169, thereby forcing the piston 173 into the position shown in FIGS. 17 and 19. The exhaust from the cylinder 157 during this portion of the jettisoning operation is conducted through conduit 172 to conduit 159, from where it is led to the reservoir return line 429 by means of conduits 451 and 443. Upon completion of this stroke, the switch 161 is thrown into contact with point 330, but because of disengagement of lug 287 from contact plate 288, as described above, the operation of the cylinder stops at the starting position shown in FIG. 19 in readiness for the next cycle. The lamps 307 and 332 are extinguished, and the jettison switch 331 is released.

In addition, the hydraulic system is provided with a relief valve 407, whereby excess pressure from the pump 404 may be released by interposition thereof through conduits 406 and 453 between the delivery of the pump and the reservoir return conduit 408. Thus the hydraulic system functions to operate the motor 425 for impelling the main drive shafts 467 and 468, to operate the jettison control cylinder 157, and further to operate the drive shaft clutch and brake, providing for simultaneous clutch engagement and brake release, or brake engagement and clutch release, all as controlled by the electrical firing and operational control system and the mechanical control of said electrical system, discussed in detail in the preceding section.

*Cyclic operation and timing*

FIG. 23 is a cycle timing chart of the feeding and loading, firing, and jettisoning operations of the present rocket launcher under automatic feed and fire. The portion of the chart entitled "Regular Cycle Timing" is a chart of the cycle timing operation during automatic feed and fire. Assuming the electric firing and control circuit of FIG. 20 to be set for automatic feed and fire, as described above, the various mechanical moving parts designated in that drawing, namely the zero cam 310, the misfire cam 313, the guide and gate tubes 101 and 102 respectively, and the jettison piston rack 151, are in the position as there shown, and further assuming that a rocket is not loaded in the guide tube, the Regular Cycle Timing Chart of FIG. 23 represents the cycle timing of one compete feed and fire cycle of the present rocket launcher. With the guide tube empty, the chart starts at zero degrees by closure of the firing key 305, whereupon the clutch and brake control solenoid 315 is immediately energized and enables operation of the feeding and loading mechanisms. The solenoid 315 is energized by a current flowing from the firing key 305 through the leads 339 and 338, feed control switch 303, a portion of the lead 340, lead 345, switch 308 to contact point 324, lead 348, switch 317, solenoid 315, and thence to ground. Solenoid 315 is energized through this circuit for the first sixty degrees of the cycle which corresponds to the duration of contact of the portion 311 of zero cam 310 with the contact roller 366. After sixty degrees of the cycle have passed, the roller 366 comes into engagement with the smaller diameter portion of the cam 310, enabling the switch 309 to engage contact 326. By rotation of the zeroing cam 310, energization of the clutch and brake solenoid 315 is then obtained through the circuit including the current source, lead 333, master switch 302, lead 334, feed control switch 303, lead 335, switch 309 then in engagement with contact 326, leads 340 and 345, switch 308 then in engagement with contact 324, lead 348, load and fire switch 316, clutch and brake solenoid 315, and thence to ground, and the firing key may then be opened without interrupting the cycle. Energization of the solenoid 315 and the resulting operation of the rocket launcher continues up to 355 degrees of the cycle, whereupon the portion 311 of the cam 310 reengages the contact roller 366 to open the latter clutch and brake solenoid energizing circuit to stop the feeding and loading operation if the firing key has been released. A coast or play in the braking mechanism is indicated on the chart for five degrees by "brake on clutch out." The feeding and loading mechanisms are thus brought to a halt with a rocket loaded in the launcher, and with the tubes 101 and 102 in readiness for firing the rocket at any time thereafter.

A rocket is now loaded in the launching barrel in readiness for firing. At any time thereafter when the firing key is once again closed, the rocket is immediately fired and the feeding and loading mechanisms again begin to operate, all of which are represented on the chart by "firing" and "magazine feeding," where the clutch is in and the brake is off for from 10 to 355 degrees of the cycle, whereupon the brake goes on and the clutch goes out if at that time the firing key is released, because of the action of portion 311 of zero cam 310 on switch 309, as described above.

During the operation of the feeding mechanism, the gate tube 102 is operated by its control cams 111, and 112 (FIG. 4) described above, bringing it from a closed gateway position to an open gateway position and again closing it, as indicated by "gate tube operation" on the chart of FIG. 23. The gate tube 102 under control of its cams begins to open the rocket receiving gateway at 170 degrees of the cycle, which is fully open at about 260 degrees thereof, remains fully open for 15 degrees, then begins to close, and is finally closed at 360 degrees of the cycle, a rocket having been loaded into the launcher during that time and the launcher now being in readiness for fire.

During the opening and closing of the gate tube the last star wheels 35a (FIGS. 1, 4, and 5) under control of the accelerator cams 40 and 41 of the feeding mechanism accelerates the next rocket to be loaded into the launcher. The accelerator cams begin to accelerate the last star wheels and the rocket under their control at 215 degrees of the cycle, as indicated on the chart by "acceleration drive," and continue to drive the star wheels until about 273 degrees of the cycle have passed, the loading stroke taking place from the beginning of the acceleration up to about 287 degrees of the cycle. At about 287 degrees of the cycle, the accelerator cams begin to drive the last star wheels back to their starting positions which are reached at 335 degrees of the cycle, in readiness to receive the next rocket and to accelerate it under control of the accelerator cams into the launcher tubes on the next cycle of operation of the present device.

Thus, under automatic feed and fire, the cycle operation of the several interlocked portions of the present device functions to continuously feed to and load rockets into the launching barrel and to automatically fire the rockets thus loaded therein, the rocket receiving gateway alternately opening and closing in synchronism therewith to present an open gateway as rockets are loaded into the barrel and a closed gateway during the firing of the rockets thus loaded therein. Under single feed and fire, the cyclic operation and timing of the feeding and loading portions of the cycle of the present device is identical to that portion of the automatic feed and fire operational cycle, but the firing of the rockets thereby loaded into the launching tube does not automatically follow the loading of the rocket, the firing being accomplished independently thereof under the control of the operator.

The portion of the cycle timing chart labeled "Misfire and Following Cycle Timing" shows the cycle timing of the misfire cam and the jettisoning operation. In the event that a rocket has failed to fire from the launcher by the time the cycle has proceeded to 95 degrees, the portion 313 of the cam 312 engages the contact roller 361, as indicated by "misfire cam" on FIG. 23. This closes the energizing circuit for relay 306 and thereby breaks the energizing circuit to the clutch and brake solenoid 315, as described in the preceding section. Thus, if the rocket has failed to fire by this time, the feeding and loading and gate tube operations cease, and at anytime thereafter the manual jettison switch 331 may be closed to start the jettisoning operation. Under automatic feed and fire this operation functions to stop the feeding and loading of rockets into the launching tube if a rocket loaded therein has failed to fire at 95 degrees of the cycle, thereby preventing a rocket jam up at the barrel upon the positioning of a dud rocket therein. Under single feed and fire, this operation functions to automatically stop the loading of rockets at 95 degrees of the cycle after a rocket has been loaded into the launching tube. As under automatic operation, a rocket so positioned in the launching tube may be jettisoned. Under both automatic and single feed and fire, the misfire cam does not affect the operation of the device if the launching tube is empty.

It is apparent that the present invention is equally applicable to the launching of various types of missiles of rocket, jet, or similar motivating power, and it is not intended to limit the scope of the present invention to the specific embodiment herein set forth, which is presented merely by way of example to more clearly describe the invention. Modifications thereof within the spirit and scope of the appended claims will be apparent to those skilled in the art and are within the monopoly embraced thereby.

The invention described herein may be manufactured and used by or for the Government of the United States of America for governmental purposes without the payment of any royalties thereon or therefor.

What is claimed is:

1. A missile launching barrel, a plurality of rotatable positive acting continuously operating loading devices for moving missiles toward said barrel and successively delivering a missile therein, said barrel comprising an inner rotatable guide tube and an outer rotatable gate tube substantially circumscribing said guide tube and having its longitudinal axis laterally offset from the axis of said inner guide tube to an extent proportional to the difference in diameters between said tubes, each of said tubes having longitudinal openings therein, said gate tube being rotatable with respect to said guide tube and about said guide tube to place said openings in and out of registry, the in registry position of said openings providing an open missile loading gateway into said barrel, the out of registry position thereof providing a closed gateway for the launching of missiles loaded in said barrel, means for synchronizing the action of said gate tube about said guide tube with the rate of operation of said loading devices to provide an open gateway into said launching barrel in coincidence with the feeding of each missile thereto by said loading means and a closed gateway upon the loading of each missile in said barrel, said guide tube being rotatable with respect to said gate tube to cause realignment of said openings in angular relationship with respect to the relationship of the openings when the openings provide said loading gateway into said barrel thereby to facilitate jettisoning of a missile from said guide tube in the event that the missile fails to function.

2. In combination, a pair of nested tubes, each of said tubes having a lateral opening therein capable of being aligned with each other to permit a missile to be delivered into the inner one of the tubes, each of said tubes being rotatably mounted for independent rotation, means for delivering a missile into said inner one of said tubes when said openings are in alignment, means including a segmental gear on the outer tube for rotating the outer tube and aligning said openings concurrently with the delivery of said missile, said rotating means being adapted additionally to rotate the outer tube to break the alignment of said openings subsequent to missile firing, and means including a segmental gear on said inner tube for rotating the inner tube and realigning said openings in a new angular position to facilitate jettisoning a missile in the event that such jettisoning is required.

3. A rocket launching device comprising an inner rotatable guide tube, an outer rotatable gate tube disposed about said guide tube and rotatable with respect to said guide tube, each of said tubes having an elongated opening formed therein and normally out of alignment with respect to each other, means including a segmental gear carried by said gate tube for rotating the gate tube with respect to said guide tube to a first position with said openings in alignment with respect to each other, a plurality of rotatable elements in engagement with a group of rockets respectively for successively moving the rockets into said guide tube when said openings are in alignment in accordance with said first position, said gate tube being rotated to a second position by said rotating means with the opening in the guide tube closed by said gate tube after said rocket is moved into said guide tube by said rotatable elements, and means including a segmental gear carried by said guide tube for rotating the guide tube with respect to said gate tube and realigning said openings in angular relationship with respect to the relationship thereof in said first position to facilitate jettisoning a missile from said guide tube.

4. A rocket launching device comprising an inner rotatable guide tube, an outer rotatable gate tube disposed about said guide tube and rotatable with respect to said guide tube, each of said tubes having an elongated opening formed therein and normally out of alignment with respect to each other, a first gear train, a segmental gear carried by said gate tube and cooperating with said gear train for rotating the gate tube with respect to said guide tube to a first position to bring said openings in alignment with respect to each other, rocket loading means including a plurality of rotatable elements for successively moving rockets into said guide tube when said openings are in alignment in accordance with said first position, said gate tube being rotated to a second position by said gear train and segmental gear to cause the opening in said guide tube to be closed by the gate tube after the rocket is moved into the guide tube by said loading means, a second gear train, a segmental gear carried by said gate tube and cooperating with said second gear train for rotating the guide tube with respect to said gate tube to cause realignment of said openings in angular relationship with respect to the relationship thereof in said first position to facilitate jettisoning a missile from the guide tube.

References Cited in the file of this patent

UNITED STATES PATENTS

| | | |
|---|---|---|
| 2,450,929 | Ashworth et al. | Oct. 12, 1948 |
| 2,451,522 | Uhl et al. | Oct. 19, 1948 |
| 2,459,314 | Goodhue | Jan. 18, 1949 |
| 2,546,823 | Holloway | Mar. 27, 1951 |

FOREIGN PATENTS

| | | |
|---|---|---|
| 636,422 | Great Britain | Apr. 26, 1950 |